United States Patent
Farokhi et al.

(10) Patent No.: US 11,527,105 B2
(45) Date of Patent: Dec. 13, 2022

(54) SYSTEM AND METHOD FOR SCALABLE CLOUD-ROBOTICS BASED FACE RECOGNITION AND FACE ANALYSIS

(71) Applicant: C2RO CLOUD ROBOTICS INC., Montreal (CA)

(72) Inventors: Soodeh Farokhi, Verdun (CA); Amir Abbas Haji Abolhassani, Montreal (CA); Felix-Olivier Duguay, Greenfield Park (CA); Aldo Enrique Vargas Moreno, Montreal (CA); Riccardo Badalone, St-Lazare (CA)

(73) Assignee: C2RO CLOUD ROBOTICS INC., Montreal (CA)

( * ) Notice: Subject to any disclaimer, the term of this patent is extended or adjusted under 35 U.S.C. 154(b) by 0 days.

(21) Appl. No.: 15/733,781

(22) PCT Filed: Apr. 26, 2019

(86) PCT No.: PCT/CA2019/050547
§ 371 (c)(1),
(2) Date: Oct. 23, 2020

(87) PCT Pub. No.: WO2019/204945
PCT Pub. Date: Oct. 31, 2019

(65) Prior Publication Data
US 2021/0049349 A1 Feb. 18, 2021

Related U.S. Application Data

(60) Provisional application No. 62/662,990, filed on Apr. 26, 2018.

(51) Int. Cl.
*G06V 40/16* (2022.01)
*G06V 10/96* (2022.01)
(Continued)

(52) U.S. Cl.
CPC ............ *G06V 40/166* (2022.01); *G06V 10/96* (2022.01); *G06V 10/993* (2022.01); *G06V 20/10* (2022.01);
(Continued)

(58) Field of Classification Search
CPC .......... G06K 9/00288; G06K 9/00664; G06K 9/00221; G06K 9/00302; G06K 9/00255;
(Continued)

(56) References Cited

U.S. PATENT DOCUMENTS 8,370,952 B1 * 2/2013 Wieder ............... H04L 63/0807 726/26
9,230,158 B1 * 1/2016 Ramaswamy ..... H04N 5/23219
(Continued)

OTHER PUBLICATIONS

International Search Report and Written Opinion in International Patent Application No. PCT/CA2019/050547, dated Jul. 17, 2019 (9 pages).

*Primary Examiner* — Nizar N Sivji
(74) *Attorney, Agent, or Firm* — Nixon Peabody LLP

(57) ABSTRACT

A system and method for performing distributed facial recognition divides processing steps between a user engagement device/robot, having lower processing power, and a remotely located server, having significantly more processing power. Images captured by the user engagement device/robot are processed at the device/robot by applying a first set of image processing steps that includes applying a first face detection. First processed images having at least one detected face is transmitted to the server, whereat a second set of image processing steps are applied to determine a stored user facial image matching the detected face of the first processed image. At least one user property associated to the given matching user facial image is then transmitted to the user engagement device/robot. An interactive action personalized to the user can further be performed at the user engagement device/robot.

15 Claims, 17 Drawing Sheets

(51) Int. Cl.
*G06V 10/98* (2022.01)
*G06V 20/10* (2022.01)
*G06V 40/50* (2022.01)

(52) U.S. Cl.
CPC ............ *G06V 40/172* (2022.01); *G06V 40/50* (2022.01); *G06V 40/178* (2022.01)

(58) Field of Classification Search
CPC ........... G06K 9/00926; G06K 9/00993; G06K 9/036; G06K 2009/00322; G06K 9/00281; G06N 20/10; G06N 20/20
See application file for complete search history.

(56) References Cited

U.S. PATENT DOCUMENTS

| | | | |
|---|---|---|---|
| 2010/0329568 A1* | 12/2010 | Gamliel | G06V 10/95 382/190 |
| 2014/0050372 A1* | 2/2014 | Qi | G06V 40/172 382/118 |
| 2014/0079298 A1* | 3/2014 | Shah | G06V 40/172 382/118 |
| 2014/0225924 A1* | 8/2014 | Loxam | G09G 5/14 345/633 |
| 2016/0019741 A1* | 1/2016 | Dua | G07F 9/002 700/241 |
| 2016/0151917 A1 | 6/2016 | Faridi | |
| 2018/0082110 A1* | 3/2018 | Myers | G06V 40/16 |
| 2021/0012549 A1* | 1/2021 | Comer | G06F 1/163 |

\* cited by examiner

FIG. 12
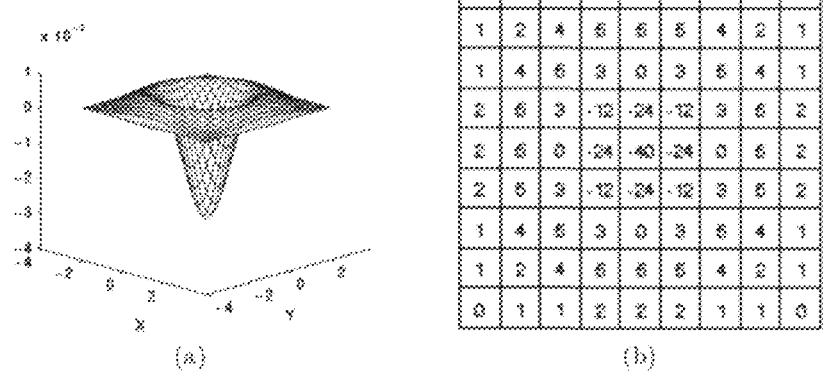
FIG. 13
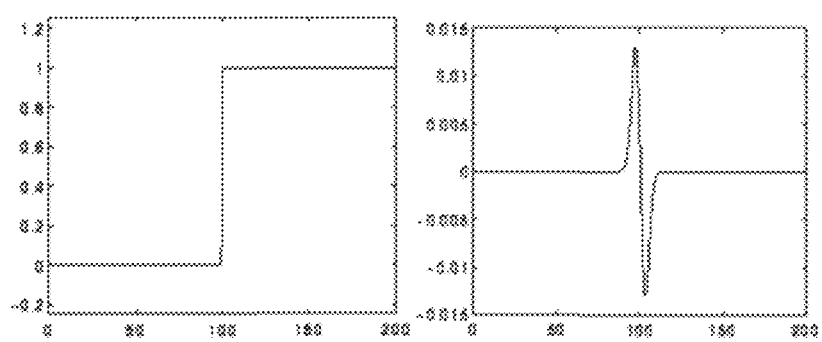
FIG. 14

| Setup | | | Light face detection | | | | Motion detection | |
|---|---|---|---|---|---|---|---|---|
| Size of image | FPS | CPU spec. | scale_factor | min_neighbors | min_size | cpu usage | cpu usage | version |
| 300x200 | 5 | 1 core 2.6GHz | 1.2 | 5 | 60 | 31% | 3.5% | 0.0.1, 0.0.2 |

FIG. 20

SYSTEM AND METHOD FOR SCALABLE CLOUD-ROBOTICS BASED FACE RECOGNITION AND FACE ANALYSIS

RELATED PATENT APPLICATION

This application is a national stage of International Application No. PCT/CA2019/050547, filed Apr. 26, 2019, and titled "SYSTEM AND METHOD FOR SCALABLE CLOUD-ROBOTICS BASED FACE RECOGNITION AND FACE ANALYSIS," which claims priority from U.S. Provisional Patent Application No. 62/662,990, filed Apr. 26, 2018, and titled "SYSTEM AND METHOD FOR SCALABLE CLOUD-ROBOTICS BASED FACE RECOGNITION AND FACE ANALYSIS," each of which is hereby incorporated by reference in its entirety.

TECHNICAL FIELD

The present disclosure generally relates to systems and methods for face recognition, and more particularly, in one embodiment, face recognition of a human user in which image processing steps are distributed between a computerized robot and a remotely located server.

BACKGROUND

Since cloud computing can provide elastic, on demand, worldwide computing and storage resources, it has been leveraged across countless use-cases, including big data analysis and real-time robot control. In other words, cloud computing has brought many new and efficient approaches for computation-intensive application areas.

There has also been a rise in robots capable of providing a level of interaction a human user. Examples include companion robots, service robots and guide robots.

One promising area is a universal platform for real-time smart device/robot control applications using server-based technology or cloud computing technology. This technology is called Cloud Robotics.

The term "Cloud Robotics", coined in 2010, is used to describe network-connected robots that take advantage of a server-based or cloud-based suite of software technologies to perform tasks. Cloud Robotics is an alternative to traditional robots that require programming or software running on an embedded controller.

SUMMARY

According to one aspect, a system for performing distributed facial recognition, comprising:
a computerized device/robot having an image capture device, a communication device, and a first processor configured for:
controlling the image capture device to capture an image of a scene;
applying a first set of one or more image processing steps to the captured image to selectively output at least a first processed image, the first set of image processing steps comprising applying a first face detection to detect at least one face in the captured image and the first processed image having the detected at least one face; and
transmitting the first processed image by the communication device
a server located remotely of the computerized device/robot, the server having at least one second processor operatively connected to a database storing a plurality of user entries each being associated with a user facial image and at least one user property, the second processor configured for:
receiving the first processed image transmitted from the computerized robot;
applying a second set of image processing steps to determine a given one of the stored user facial images matching the face of the first processed image; and
transmitting the at least one user property associated to the given matching user facial image to the computerized device/robot.

According to an aspect, there is provided a computerized device/robot comprising:
an image capture device;
a communication device;
a user interactive device; and
a processor operatively connected to the image capture device, the communication device and the user interactive device, the processor configured for:
controlling the image capture device to capture an image of a scene;
applying a first set of one or more image processing steps to the captured image to selectively output at least a first processed image, the first set of image processing steps comprising applying a first face detection to detect at least one face in the captured image and the first processed image having the detected at least one face; and
transmitting the first processed image by the communication device to a remotely located server configured to applying a second set of image processing steps to determine a match of a given user facial image stored at the server with the face of the first processed image;
receiving from the remotely located server at least one user property stored in association with the given matching user facial image; and
presenting, by the user interactive device, the received at least one user property.

According to another aspect, there is provided a system for performing scalable facial recognition comprising:
a plurality of computerized devices being located at a plurality of distributed locations, each computerized device having a respective image capture device, a communication device and a processor configured for:
controlling the image capture device to capture an image of a scene;
applying a first set of one or more image processing steps related to facial recognition to the captured image to selectively output at least a first processed image; and transmitting the first processed image by the communication device; and
a server located remotely of the computerized devices, the server having at least one second processor configured for:
receiving from any one of the plurality of computerized devices, a respective first processed image;
for each received first processed image:
applying a second set of image processing steps related to facial recognition to the first processed image to extract at least one facial feature;
determining an interaction based on the extracted facial feature; and
transmitting the determined interaction to the computerized device associated to said first processed image.

According to another aspect, there is provided a computer-implemented system for facial recognition of an image, the system comprising:
 at least one data storage device storing a plurality of user entries each being associated with a user facial image and at least one user property; and
 at least one processor coupled to the at least one storage device, the at least one processor being configured for:
  receiving a captured image of a scene;
  applying a face detection to detect presence of a face within the scene;
  evaluating a quality of the captured image for facial recognition, the evaluating generating a set of at least one quality metric;
  if the at least one quality metric is below a set of at least one metric threshold, discarding the image for further processing;
  applying facial feature extraction to the processed image to extract facial elements from the face of the captured image; and
  applying face recognition to determine a given one of the stored user facial images matching the face of the captured image.

According to another aspect, there is provided a method for performing distributed facial recognition comprising:
 capturing, at a computerized robot, an image of a scene;
 applying, at the computerized robot, a first set of one or more image processing steps to the captured image to selectively output at least a first processed image, the first set of image processing steps comprising applying a first face detection to detect at least one face in the captured image and the first processed image having the detected at least one face; and
 transmitting, from the computerized device/robot, the first processed image;
 receiving the first processed image transmitted from the computerized device/robot at a remotely located server having a database storing a plurality of user entries each being associated with a user facial image and at least one user property;
 applying, at the server, a second set of image processing steps to determine a given one of the stored user facial images matching the face of the first processed image; and
 transmitting, from the server, the at least one user property associated to the given matching user facial image to the computerized robot.

According to another aspect, there is provided a computer-implemented method for facial recognition of an image, the method comprising:
 receiving a captured image of a scene;
 applying a face detection to detect presence of a face within the scene;
 evaluating a quality of the captured image for facial recognition, the evaluating generating a set of at least one quality metric;
 if the at least one quality metric is below a set of at least one metric threshold, discarding the image for further processing;
 applying facial feature extraction to the processed image to extract facial elements from the face of the captured image; and
 applying face recognition to determine a given one of a plurality of stored user facial images matching the face of the captured image.

According to another example, there is provided a method for performing scalable facial recognition, the method comprising:
 providing a plurality of computerized devices at a plurality of distributed locations, each computerized device having a respective image capture device and a communication device;
 capturing, at each of one or more of the computerized devices, an image of a scene;
 at each of the one or more of the computerized devices, applying a first set of one or more image processing steps related to facial recognition to the image captured by the computerized device to selectively output at least a first processed image, and transmitting the first processed image;
 receiving the first processed images transmitted from each of the one or more computerized devices at a remotely located server;
 at the remotely located server, for each received first processed image:
  applying a second set of image processing steps related to facial recognition to the first processed image to extract at least one facial feature;
  determining an interaction based on the extracted facial feature; and
  transmitting the determined interaction to the computerized device associated to said first processed image.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:
FIG. 12 shows the kernels used in the blurriness filter of the experimental setup;
FIG. 13 shows a Gaussian kernel and Laplacian kernel of the blurriness filter of the experimental setup;

FIG. 14 represents the response of the Laplacian-Gaussian kernel of the blurriness filter of the experimental setup;

FIG. 20 is a chart that shows CPU usage for motion detection versus face detection.

Figure 1:
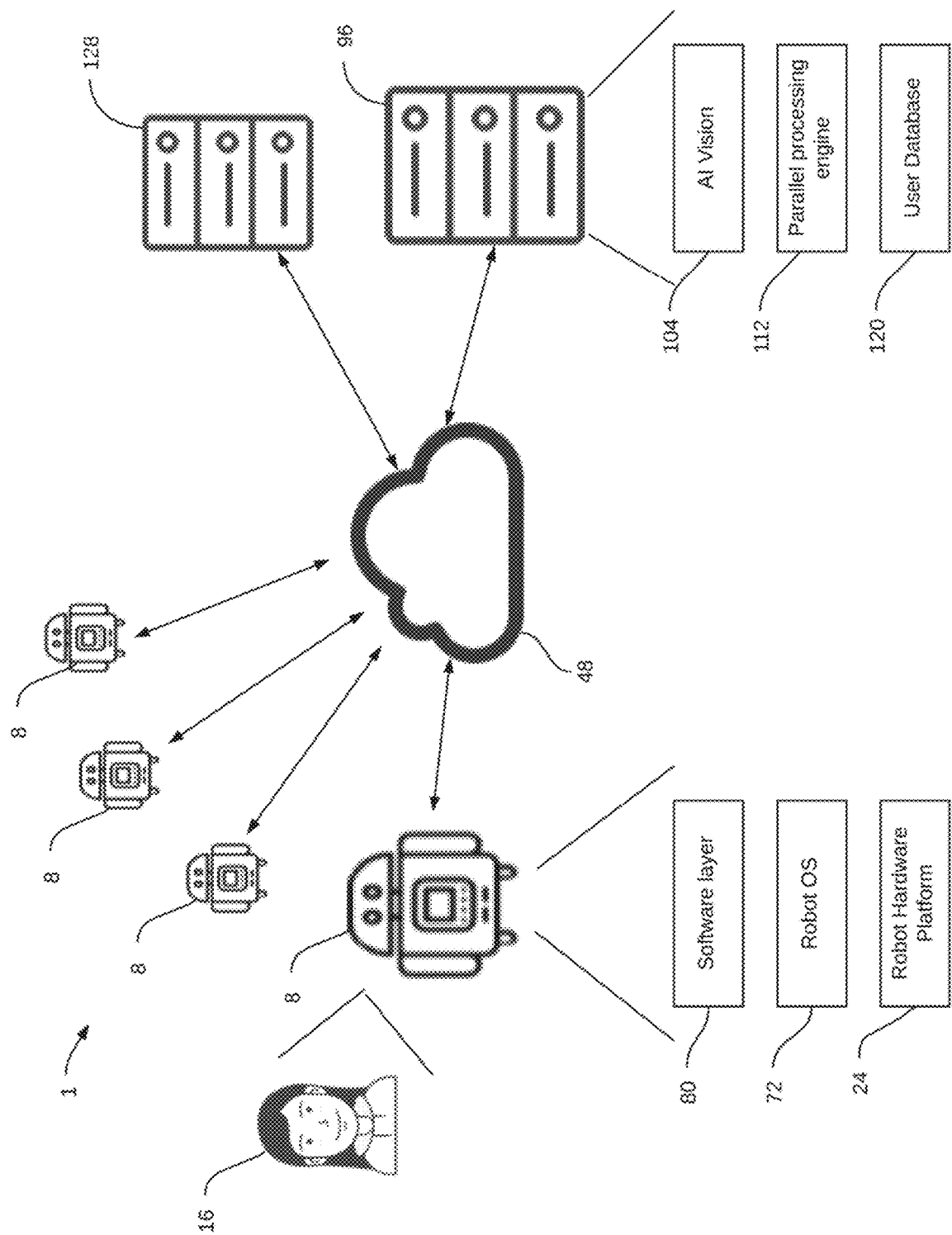
FIG. 1 illustrates a schematic diagram of a cloud robotics-based system according to an example embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"User-engagement device/robot" herein refers to a computerized device or robot that is operable to provide a level of engagement or interaction with a human user. In particular, the user-engagement device/robot is operable to receive or detect a characteristic about the human user. The user-engagement device/robot is also operable to perform an interactive action to convey information to the human user. While the user engagement device/robot may have a displacement subsystem according to some embodiments, it will be understood that the device/robot may also be implemented as a stationary unit, such as on a desktop computer, laptop, tablet, game console, smartphone, or the like.

The user engagement device/robot may be a service robot, a security robot, or a guide robot and may be deployed in a commercial setting, hotel setting, conference center setting, museum setting, retail setting, nursing home setting, office building setting, public infrastructure setting (ex: airport, hospital, medical center, public transportation setting, etc). The user engagement robot will typically be deployed to provide a service for a human user, and can take the form of a customer service robot, hospitality robot, receptions robot, guidance robot, cleaning robot, security robot, delivery robot, tele-presence robot.

"Cloud robotics-based system" herein refers to a system that includes at least one user-engagement device/robot and at least one server located remotely of the user-engagement device/robot and in which sets of computing tasks may be distributed between the user-engagement device/robot and the at least one server. The at least one server may be a network of cloud-based servers. However, it will be understood that the at least one server may also be a dedicated server in some example embodiments.

Referring now to FIG. 1, therein illustrated is a schematic diagram of a cloud robotics-based system 1 according to an example embodiment. The system 1 includes at least one user-engagement device/robot 8. In the illustrated example, and in most applications, a plurality of user-engagement device/robots 8 may be provided. The cloud robotics-based system 1 provides scalability in that additional user-engagement device/robots 8 can be added according to the requirements of a given application.

The user engagement device/robot 8 is operable to interact with a human user 16 (ex: receive and/or detect characteristics of the human user 16 and convey information to the human user 16).

Figure 2:
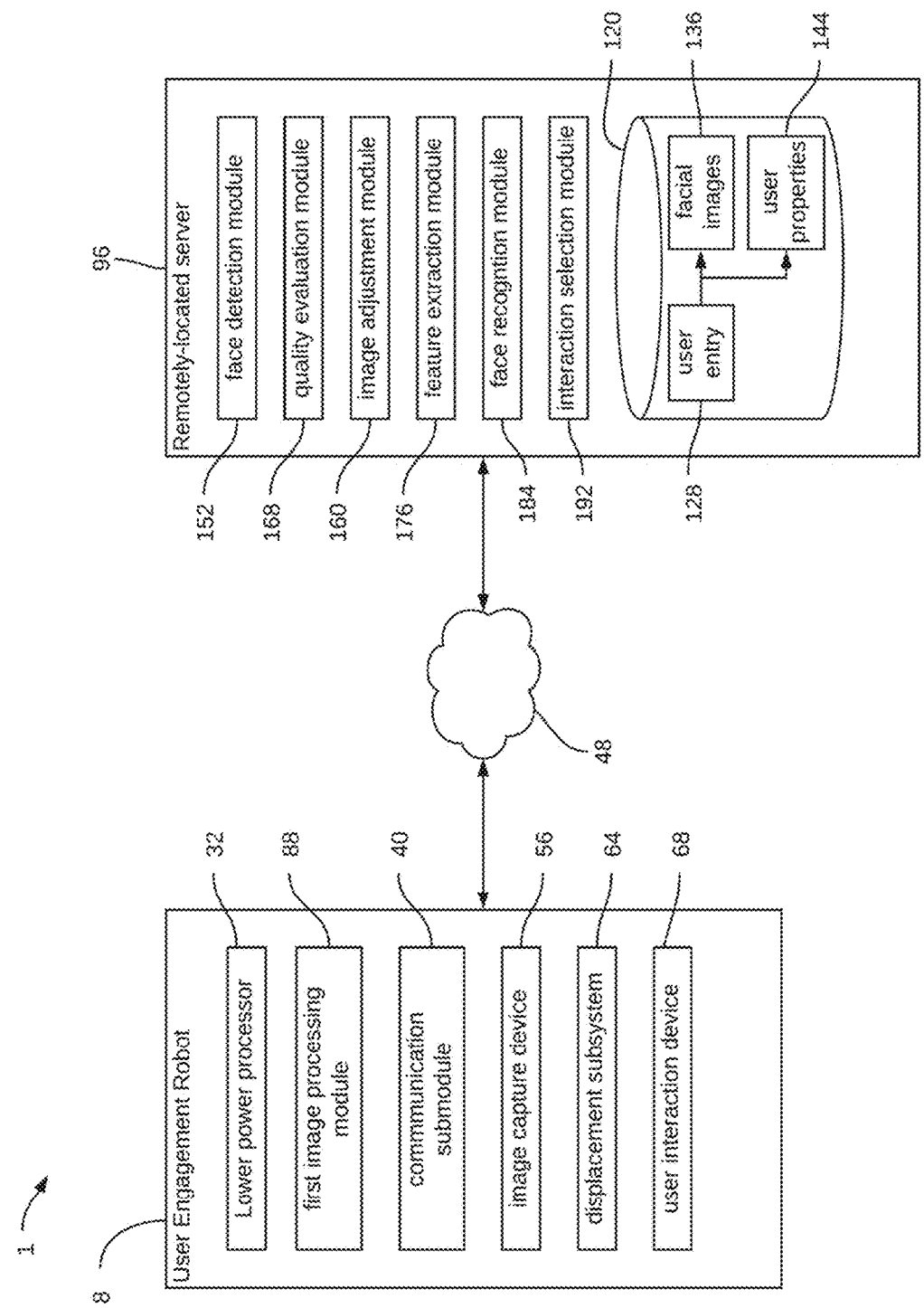
FIG. 2 illustrates a schematic diagram showing the operational modules of the cloud robotics-based system according to example embodiment.

Referring now to FIGS. 1 and 2, the user engagement device/robot 8 may include a hardware platform 24, which includes the various hardware components of the device/robot 8. The hardware platform 24 includes the on-board computer hardware (at least one processor 32, a data storage system, etc.). In some embodiment, the at least one processor 32 can include one or more processing units operating together (ex: a CPU and a GPU). However, it will be understood that for cost and power considerations, the at least one processor 32 will typically only include a low-power CPU without a GPU. The hardware platform 24 further includes a communication module 40 for communication over a network 48. The network 48 may be a local area network or a wide area network (ex: Internet). The communication module 40 may provide wired communication or wireless communication over the network 48.

The hardware platform 24 also includes one or more sensors, including an image capture device 56.

According to various example embodiments, the user engagement device/robot 8 is an autonomous robot and the hardware platform 24 includes a displacement subsystem 64 operable to displace the user engagement robot 24. The sensors may also include one or more navigation sensors (ex: 3D camera, RGBD camera, infra-red sensors, Lidar, sonar, accelerometer, etc).

The hardware platform 24 further includes at least one user interactive device 68 for performing an interactive action. The interactive device 68 may include an electronic display device, a sound system, a lighting system, or the like. The interactive device can also be a user input device to receive information from the user, such as a keyboard, touchscreen, mouse, camera, microphone, or other user input devices known in the art.

In some example embodiments, the user-engagement device/robot 24 may be battery-powered and the hardware platform 24 includes a battery subsystem and components for managing the battery subsystem.

Continuing with FIG. 1, the user engagement device/robot 8 further includes an operating system 72 for managing the hardware platform 24 and for providing a software layer 80. The user engagement device/robot 8 may use a robot operating system known in the art, such as ROS, OpenRTM-aist, or NAOqi.

The user engagement device/robot 8 further includes a software layer 80 that includes a plurality of programs executing on the user engagement device/robot 8. A first face detection module 88 executing a set of at least one image processing steps can be implemented within the software layer 80.

Continuing with FIG. 1, the cloud robotics-based system 1 further includes at least one server 96 located remotely of the user engagement device/robot 8. As is known in the art, the server 96 can be implemented as one or more mainframe or workstation computers. The server 96 can be a cloud-based server or a dedicated server. As illustrated, the server 96 is in communication with the one or more user engagement robots 8 over the network 48.

The server 96 includes at least second processor, which may be a multi-core processor permitting execution of multiple computing tasks in parallel. The server 96 may also include a plurality of processors that can also execute multiple computing tasks in parallel. It will be understood that the computing power of the remotely connected server 96 is significantly greater than the computing power of each individual user engagement device/robot 8. Furthermore, the server 96 can be scaled upwardly or downwardly to increase or decrease its computing power according to the needs of the required solution.

An artificial intelligence engine 104 may be implemented on the server 96. One or more artificial intelligence algorithms may be applied on data received at the server 96 from the one or more user engagement robots.

The server 96 may also include a parallel processing engine 112 that is operable to manage multiple computing tasks and cause the tasks to be executed in parallel (ex: where a plurality of user engagement robots 8 transmit data to the server 96 for exaction in parallel).

The server 96 also includes a storage system that stores a user database 120. The user database 120 include information pertaining to human users that interact with the user-engagement device/robots 8 of the cloud robotics-based system 1.

Continuing with FIG. 1, in various example embodiments, the system 1 may further include one or more external computing systems 128. The external computing systems 128 include one or more databases that store information that may be pertinent to the human users whose information is stored within the user database 120. Properties of users stored within the user database 120 can be shared by the server 96 with the external computing system 128 and user-relevant information can be received at the server 96 from the external computing system 128, ex: CRM, ERP, POS, customer management, e-commerce database, loyalty program database, etc.

It will be understood that within the cloud robotics-based system 1, some systems are fairly easy and cost-efficient to scale upwards (i.e. upgrade) while other systems are far more complex and costly to scale upwards. In particular, within the system 1, the size and available computational power of the server 96 is easily scalable upwards or downwards. This can be carried out by adding or removing a number of machines within the server 96, or upgrading the hardware according to known upgrade paths. Furthermore, within the system 1, the number of user engagement device/robots 8 is easily increased. Additional device/robots 8 can be deployed at additional locations and configured to be in communication with the server 96 (and the server 96 can be upgraded to cope with the added number of robots 8 that need to be served).

It will be further understood that the application of hardware upgrades to each individual user engagement device/robot 8 is far more complex and costly to carry out. In many cases, the hardware components (ex: CPU, memory size, communication module speed) that are included in each device/robot 8 at the time of initial deployment will not be upgraded during the lifetime of the device/robot 8. This represents an important limitation that must be considered during the initial configuration of system 1 and in any subsequent modifications (ex: software upgrades).

Furthermore, within the cloud robotics-based system 1, providing computational power on the side of the user engagement device/robot 8 is far more costly than providing that same computational power on the side of the server 96. For example, equipping each user engagement device/robot 8 with powerful CPUs and/or GPUs is far more expensive than having the same available processing power at the server 96. In this manner, the user engagement devices/robots 8 can be understood as each having computational power that is substantially fixed.

It will be appreciated that this is a known advantage of cloud computing. Accordingly, it is desirable to limit the processing power on the side of each user engagement device/robot 8 in order to be cost effective. However, this limitation of the processing power must strike a balance with bandwidth requirements. In other words, the processing power side of the user engagement device/robot 8 must be sufficient such that the processing steps carried out at each user engagement device/robot 8 allows the data that needs to be sent to the server 96 stays within predefined bandwidth thresholds. This can be an important consideration where the user engagement device/robot 8 is battery powered and communicates wirelessly with the server 96 and any transmission of data is a significant drain on the battery of the user engagement device/robot 8.

In some example embodiments, the user engagement device/robot 8 can have different specification, such as image capture devices 56 having different specifications. Processing steps can be carried out at the user engagement device/robot 8 to account for these differences, for example, by pre-calibrating the user engagement device/robot 8 prior to deployment. However, each user engagement device/robot 8 can have a baseline computational power to carry out the first set pf image processing steps on the device-side prior to transmission to the server 96. Accordingly, the second set of processing steps performed at the server 96 can be agnostic to the user engagement device/robot 8, which further facilitates scaling on the device side (ex: by selectively adding new user engagement device/robot 8) and/or server side (ex: by scaling processing power of the server based on number of connected user engagement device/robot 8).

Referring now to FIG. 2, therein illustrated is a schematic diagram of the operational modules (which may be implemented in hardware, software, or a combination thereof) of the cloud-robotic based system 1 according to an example embodiment. As described elsewhere herein, the user-engagement device/robot 8 includes an image capture device 56 and a communication device 40 that are both coupled to the processor 32. The processor 32 of the user-engagement robot 1 represents a first processor of the cloud-robotics based system 1.

In operation, the image capture device 56 is controlled by the processor 32 to capture an image of a scene. The image capture device 56 can be controlled to capture a sequence of images, some of which may include a face of a human user.

The first image processing module 88 is configured to apply a first set of one or more image processing steps to the captured image to selectively output at least a first processed image. The first set of one or more image processing steps may include one or more steps related to facial recognition of face(s) found in the scene of the captured image. Steps related to facial recognition may include face detection, face tracking, motion detection, image resizing, and image enhancement, as described elsewhere herein.

This set of image processing steps may include applying a first face detection to detect at least one face in the captured image as one of the steps related to facial recognition. If a human face is detected in the captured image, the outputted first processed image includes the at least one face of the human user. If a human face is not detected, the processed image is not outputted, and another captured image is processed to determine if a human face is present in that image.

Applying this first face detection may include determining at least one subarea of the captured image containing the at least one face and the at least one subarea is outputted as the first processed image. Where a plurality of faces is detected within the captured image, a plurality of subareas that each correspond to a detected face is identified, and each subarea is outputted as a first processed image.

The first processor 32 is further configured to transmit the at least one first processed image by the communication device 40 to the remotely located server 96.

The first processor 32 may be configured to capture a sequence of images and the first set of image processing steps is applied to each of the images of the sequences. Those images of a captured scene that includes the detected face of a human user are outputted as first processed images and these images are further transmitted to the remotely located server 96. Where the first processed images are formed of the subareas of the captured images containing a human face, only these subareas are transmitted to the remotely located server 96.

Continuing with FIG. 2, the remotely located server 96 includes the user database 120 and one or more image processing modules that apply a second set of image processing steps. The user database 120 stores a plurality of user entries 128, which are each associated with at least one respective user facial image 136 and at least one respective user property 144. The user properties 144 can include an identifier of the user (ex: user ID) and other user-related characteristics (ex: first name, last name, email address, phone number, predicted age, predicted gender, etc.) The user properties 144 can also include user history (ex: time of detections, locations of detections, predicted emotions, past actions, past purchases, etc.). The user properties 144 may also include user-defined preferences or system-defined preferences determined based on user history.

The first processed image(s) transmitted by the user engagement device/robot 8 are received at the remotely located server 96. The image processing modules of the remotely located server 96, which may be implemented by software modules executed by the processor(s) of the server 96, apply a second set of image processing steps to the received processed image(s) related to facial recognition. Generally, the facial recognition extracts at least one facial feature of the faces captured in the received first processed image(s). The second set of image processing steps related to facial recognition can be applied to determine a given one of the stored user facial images of the user database 120 that matches the human face captured by the user engagement device/robot 8. The processor(s) of the server 96 represent a second processor of the cloud robotics-based system 1.

As described elsewhere herein, the server 96 can be connected to a plurality of user engagement device/robots 8 that are located at a plurality of distributed locations. The server 96 can receive the respective first processed image from any one of the user engagement device/robots 8, including receiving multiple first processed images in parallel. The second set of image processing steps related to facial recognition can be applied by the server 96 to each of the received first processed images.

After identifying a stored user facial image 136 that matches the human face captured in the first processed image, the server 96 can be configured to transmit, a notification to the user engagement device/robot 8 that a match has been found. At least one user property 144 that was associated to the user entry 128 of the match user facial image can also be transmitted.

Continuing with FIG. 2, and according to one example embodiment, the image processing modules of the remotely located server 96 that apply the second set of image processing steps include a second face detection module 152, an image adjustment module 160, an image quality evaluation module 168, a facial feature extraction module 176, a face recognition module 184 and an interaction determination module 192. Operation of these modules will be described with reference to methods for face recognition.

Figure 3:
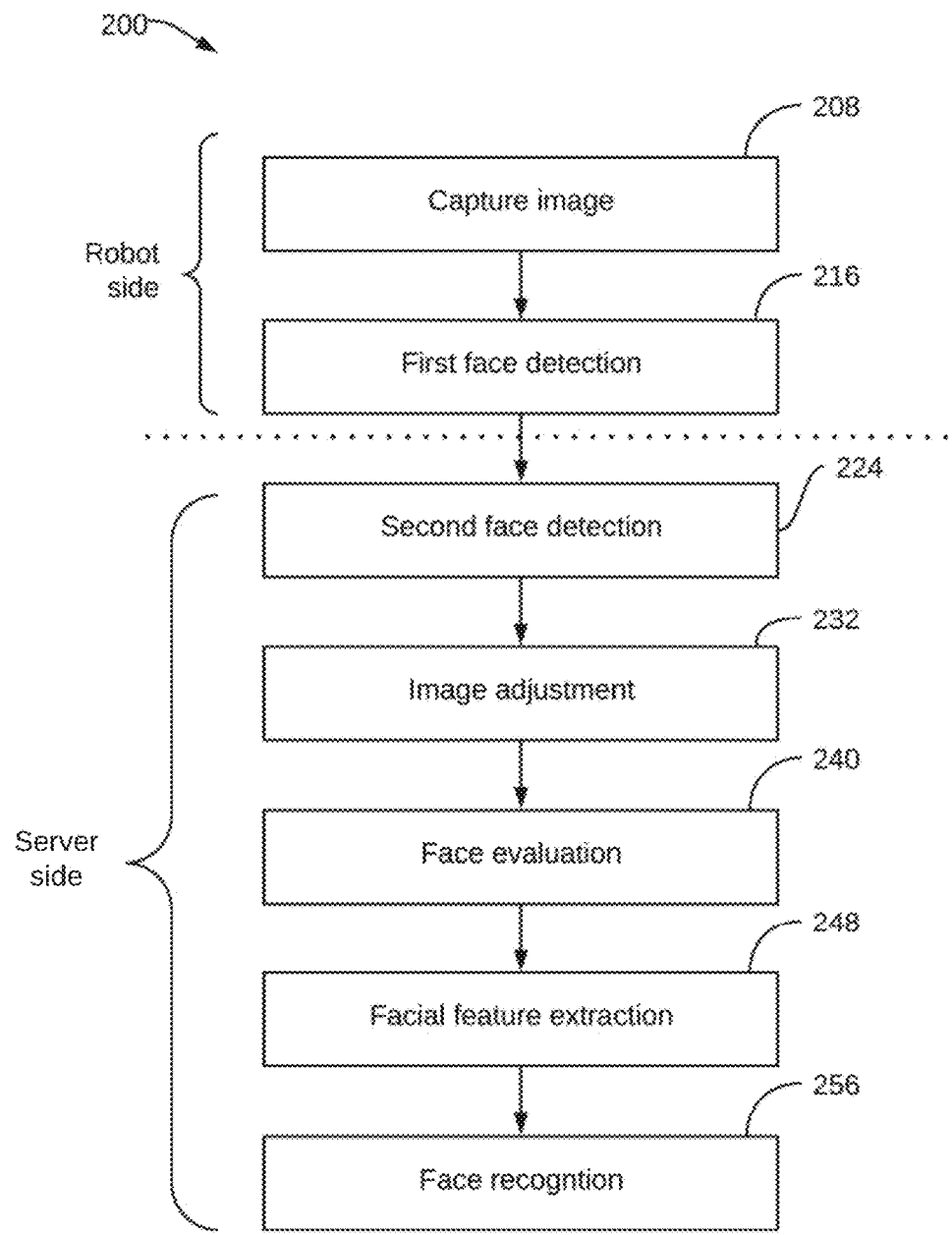
FIG. 3 illustrates a flowchart of the operational steps of a method for cloud robotics-based face recognition according to an example embodiment.

Referring now to FIG. 3, therein illustrated is a flowchart showing the operational steps of a method 200 for cloud robotics-based face recognition according to an example embodiment.

At step 208, an image of a scene is captured using image capture device 56 of the user engagement device/robot 8.

At step 216, the first step of one or more image processing steps is applied to the captured image to selectively output at least the first processed image. As described elsewhere herein, the first image processing module 88 of the user engagement device/robot 8 applies a first face detection to detect at least one face in the captured image.

It was observed that applying the first face detection on the robot side has the effect of reducing the total amount of data and the data rate (ex: data per second) transmitted from the user engagement device/robot 8 to the remotely located server. This has the advantage of reducing data usage and bandwidth requirements. In applying the first face detection to each of a sequence of captured images, only those captured images of scenes that include a human face, as determined from the first face detection, are transmitted from the user engagement device/robot. Furthermore, where the first face detection determines the one or more subareas of the captured image that correspond to a human face, only these subareas are transmitted as first processed images from the user engagement device/robot 8, further decreasing data requirements.

According to various example embodiments, the first face detection is applied using less stringent detection setting to use less CPU usage. That is, the first face detection is configured so that the images are more likely to be identified as being a face. This may lead to a higher occurrence of false positives (images being detected as corresponding to a human face even though no human face is present). As described elsewhere herein, occurrences of false positives can be addressed on the server side, for example, within the second face detection at step 224.

Figure 4:
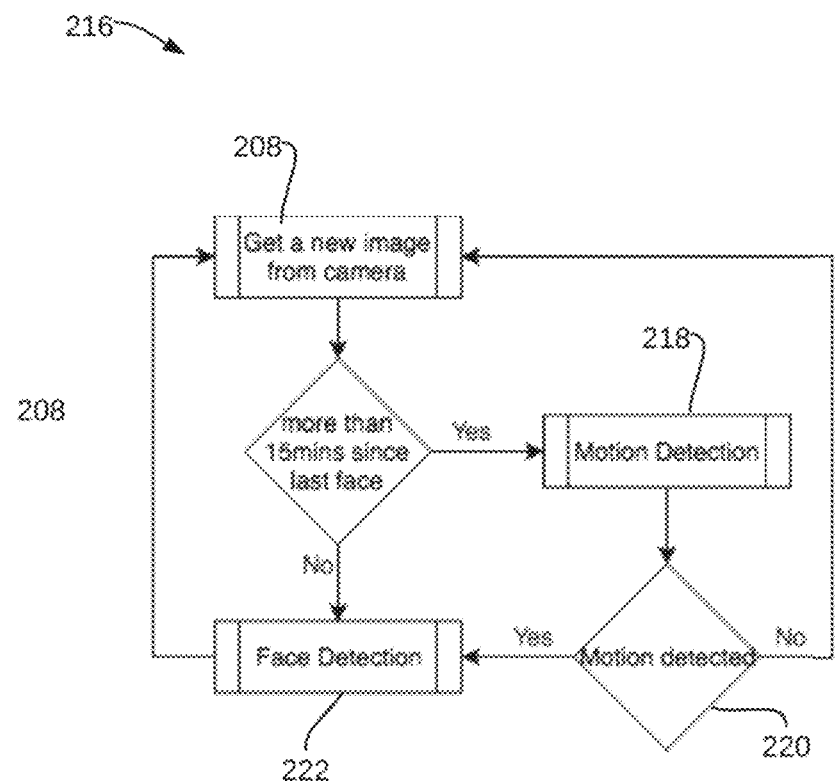
FIG. 4 illustrates the operational steps of a method for applying the first face detection at the user engagement robot according to an example embodiment.

According to an example embodiment, and as illustrated in FIG. 4, the applying the first face detection at the user engagement device/robot 8 includes selectively operating in an active face detection mode and in a motion detection mode.

In the active face detection mode, the first face detection is applied directly to the captured image. For example, for a sequence of images, the first face detection is applied directly to each captured image of the sequence.

In the motion detection mode, motion detection is initially applied to the captured image. If motion is detected in the captured image, then face detection is applied to that image. If no motion is detected, that image is discarded. For example, for a sequence of images, motion detection is applied to each captured image of the sequence while face detection is applied only to those images for which motion has been detected.

The first face detection step 216 enters the motion detection mode from the active face detection mode upon no faces being detected within the sequences of images over a predefined time interval. In the example illustrated in FIG. 4, the predefined time interval is set to 15 minutes, and the first face detection enters the motion detection mode to detect motion at step 218 after the 15 minutes has elapsed without detecting a face in the sequence of images.

The first face detection step 216 enters the active face detection mode from the motion detection mode upon detecting a face from applying the first face detection mode while operating in the motion detection mode. It will be appreciated that in the example illustrated in FIG. 4, a face will have been detected within the predefined time interval at step 220, and step 216 proceeds directly to applying face detection at step 222.

The computation load while operating in the motion detection mode may be substantially lower than the computation load while operating in the active face detection mode. Accordingly, by permitting the motion detection mode, wherein face detection is not applied to each image of the captured sequence, a savings in processor usage is achieved, which may also reduce battery usage.

Returning to FIG. 3, the first processed image as outputted by the first face detection step 216 is transmitted from the user engagement device/robot 8 to the server 96. The second set of image processing steps are applied to the received first processed image at the server 96.

According to various example embodiments wherein multiple faces are detected within a captured image and a plurality of first processed images, corresponding to subareas of the captured images, are generated, the second set of image processing steps may be initially applied to the largest subarea. It will be appreciated this largest subarea corresponds to the largest face within the captured scene, which typically also corresponds to the human face that is located closest to the image capture device.

At step 224, a second face detection is applied at the remotely connected server 96 to the captured image, which is the first processed image received from the user engagement device/robot 8. The second face detection is part of second set of image processing steps related to facial recognition applied at the server 96 and may be applied by the face detection module 152.

The second face detection serves to verify that the subarea of the captured image that the first face detection detected as corresponding to a face is actually a face, and not a false positive. The second face detection at step 224 applies more stringent detection settings than the detection settings of the first face detection of step 216. Accordingly, the second face detection has a lower occurrence of false positives than the first face detection, and therefore a greater face detection accuracy. The second face detection is used to identify those false positives detected by the first face detection. Where the second face detection determines that a face is not present in the face processed image, the image is discarded from further processing within the second set of image processing steps. If a face is verified as being present, the image processing is continued at the server 96.

The computation load for the second face detection can be substantially greater than a computation load for the first face detection at step 216, which leads to a greater detection accuracy for the second face detection of step 224.

At step 232, an image adjustment is applied to the first processed image. The image adjustment is part of the second set of image processing steps applied at the server 96 and may be applied by the image adjustment module 160. The image adjustment adjusts one or more properties of the first processed image prior to further processing at the server 96. These image adjustments improve the likelihood of accurately recognizing a match of the face in the first processed image with a user face image 136 stored in the user database. A second processed image can be outputted from the image adjustment at step 232 and the second set of image processing steps can be continued on this second processed image.

The image adjustment can include applying a normalization. This normalization corrects contrast within the captured face, which may be caused by lighting conditions present on the face.

The image adjustment can also include applying an equalization. The equalization can be an adaptive histogram equalization.

The image adjustment can further include adjusting an alignment of the face. This may include warping the image to change the align facial features (eyes, nose, etc.), which may improve face recognition accuracy. The image warping may include one or more of image shearing and one or more linear transformations, such as image rotation.

At step 240, a facial image quality evaluation is applied to the processed image, which may be the second processed image after image adjustment at step 232. The quality evaluation is part of the second set of image processing steps applied at the server 96 and may be applied by the quality evaluation module 168. The quality evaluation generates a set of at least one quality metric of the processed image. The quality metric is further compared against a set of metric thresholds. If any one of the equality metric is below a corresponding threshold, the image is discarded from further processing with the second set of image processing steps.

A first quality metric is a blurriness of the processed image and a blurriness quality metric is outputted. Blurriness can be caused by out of focus camera lens, motion blur and saturated lighting in the scene. Image blur reduces the sharpness of the facial features, mainly the edges, corners and ridges and deteriorates the face recognition.

Another quality metric is facial completeness. The facial completeness quality metric attempts to detect a nose element and a pair of eye elements within the face of the processed image. The facial completeness quality metric provides an indication of whether the nose element and the pair of elements are present in the processed image. For example, parts of the user's face may be occluded (ex: by an object or the user having their face turned) when the face is captured. Alternatively, multiple faces may have been captured. In one embodiment, the processed image having less than or more than two eyes, or less than or more than one nose is discarded from further processing.

Figure 5:
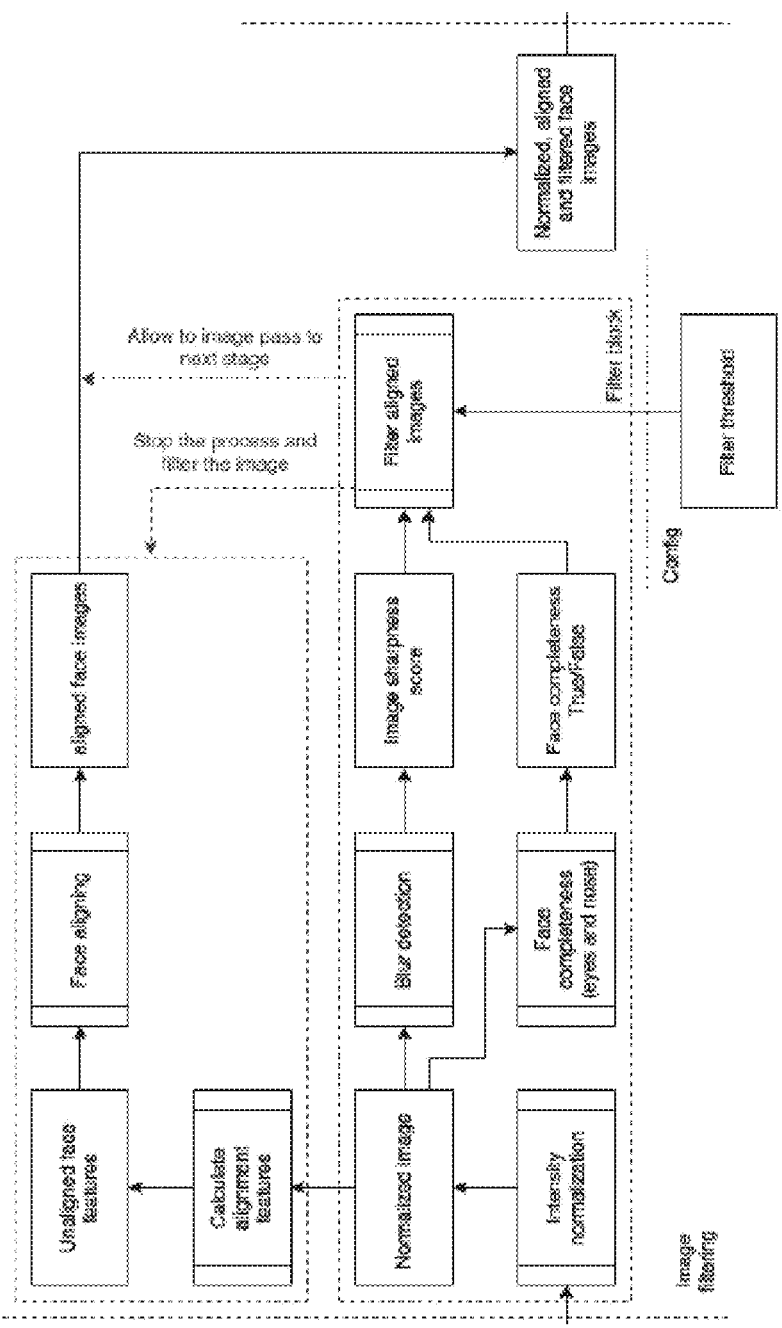
FIG. 5 illustrates the operational substeps of an image adjustment and quality evaluation step.

FIG. 5 illustrates a combined image adjustment and quality evaluation step.

Continuing with FIG. 3, at step 248, a facial feature extraction is applied to the processed image to extract facial elements from the face of the processed image. The facial feature extraction is part of the second set of image processing steps applied at the server 96 and may be applied by the feature extraction module 176. The facial feature extraction outputs features which can be used as inputs to the face recognition module 184.

At step 256, face recognition is applied to the processed image to determine whether the face contained in the image represents a match to one of the user facial images. The face recognition is part of the second set of image processing steps applied at the server 96 and may be applied by the face recognition module 184. The face recognition is applied to the image captured by the image capture device 56. More particularly, the face recognition may be applied to the second processed image after the image adjustment and face evaluation at step 232 and 240. Facial features extracted at step 248 can also be inputted to the face recognition module 184. The facial features can be defined as a set of numerical values.

According to one example embodiment, the user facial images 136 stored in the user database 120 are stored as a set of facial feature values. These facial feature values can be numerical values that define the properties of the facial features of the user facial images. The facial feature values can be generated from application of the facial feature extraction to the captured image of a user's face, such as during a training step.

Accordingly, the face recognition at step 256 can consist essentially of comparing the facial features, which may be defined as numerical values, extracted at step 248 against the sets of facial feature values 136 stored in association with user entries 128 in the user database 120. A stored set of facial feature values 136 representing a sufficient correspondence with the feature features extracted at step 248 is determined as being a match. It will be understood that the face recognition at step 256 does not need to apply an image to image comparison in such an example embodiment, which may increase the performance (ex: speed) of the face recognition step 256.

According to one example embodiment, the face recognition module 184 includes a face recognition engine, which may be an artificial-intelligence (AI) based engine. The face recognition engine can be trained by new facial images and classify images using its trained database. The AI-based engine may be implemented using the AI vision engine 104 of the server 96.

The face recognition engine can be an online engine, which allows the engine to be trained on an ongoing bases. As described elsewhere herein, faces of human users that are added to the user database are used to train the face recognition engine, which permits recognizing those users in future instances.

Alternatively, the face recognition engine can be an offline engine and is trained prior to deployment.

The face recognition module 184 can provide an output indicating that a match has been found and the stored user facial image 136 of database 120 representing the match with the face of the human user captured in the image. The face recognition module 184 can also determine that the face of the captured image does not represent a sufficient match with any one of the stored user facial images and output an indication that a match has not been found.

Figure 6:
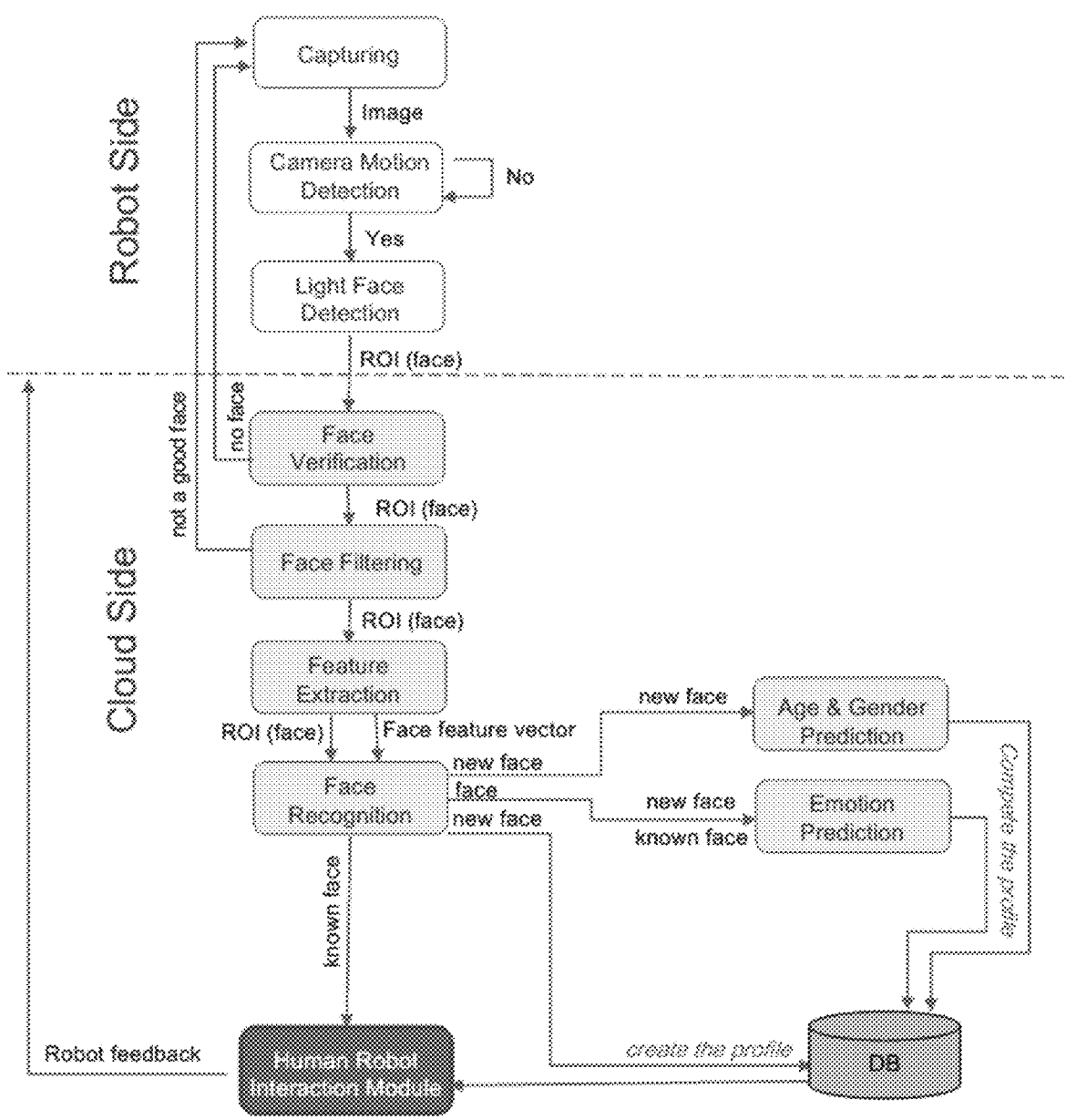
FIG. 6 illustrates a flowchart showing the operational steps of a method according to an alternative example embodiment.

Referring now to FIG. 6, therein illustrated is a flowchart showing the operational steps of a method according to an alternative example embodiment in which an age/gender and/or an emotion is of the face is also predicted within the face recognition at step 256.

Continuing with FIG. 5, where an output of the face recognition module 184 indicating a found match is received at the interaction module 192 of the server 96, an interactive action to be performed by the user engagement device/robot 8 is further determined. The one or user properties 144 stored in association with the given facial image representing the match to the face in the captured image can be retrieved and the interactive action to be performed can be determined based on the user property.

In one example embodiment, the user property can be a user identifier (ex: first name and last name of the user) and the interactive action can simply be displaying the user identifier at the user engagement device/robot 8. Accordingly, the user identifier is transmitted from the server 96 to the user engagement device/robot 8 and the user identifier is displayed on the display device of the device/robot 8 (ex: "Hi, Jane Doe!").

Other user properties can include one or more of user history, user schedule appointments, etc and the interactive action may be a suggestion or prompt for the user to take action (ex: "Your flight is in 2 hours, would you like to print your boarding pass?", "It'll be your birthday soon, go to counter to receive your free gift", "As our VIP customer, you have this promotion code today, use this at the counter to get your discount", "Watch this product video as a new model of the one you bought in Jan 2018, like it at the end if you are interested to get a promotion on this purchase today"). It will be appreciated that identifying the user allows the interactive action to be customized to that human user.

According to one example embodiment, one or more user-relevant properties can be stored at the external system 128 and the interaction module 192 can send the user identifier to the external system 128. The interaction module 192 can further receive the externally stored user-relevant property from the external system 128 and determine the interactive action to be performed. The user-relevant property can also be transmitted to the user engagement device/robot 8.

The determination of the interaction action may also include one or more current contextual features. For example, where an emotion is detected in the face recognition step 256, the interactive action is determined that is appropriate for that emotion.

An additional action can also be determined, such as notifying an external device. For example, a notification (sms, email, or the like) can be sent to a predefined external device in response to recognizing a match at step 256 to a stored user facial image having a specific type of user property. For example, where a match to a given user is identified and one of the user properties indicates that the user is a VIP (or blacklisted), a notification may be sent to the business owner (external party). The business owner can then provide an appropriate service to that user (ex: special treatment for the VIP or refusing service to the blacklisted user).

Where an output of the face recognition module 184 indicating a match has not been found is received at the interaction module 192 of the server 96, an interactive action indicating that a match has not been found can be selected and transmitted to the user engagement device/robot 8. In response to receiving this indication, a message can be displayed on the display device of the user engagement device/robot 8 to prompt the human user to provide information to be stored as a new user entry within the database 120. Additionally, a new user entry can be created within the user database 120 to store this received information. The captured image (ex: second processed image outputted by the image adjustment module 160) can further be stored in association with the user entry 128 as one of the user facial images 136 for that user entry 128. The face recognition module 184 is further trained using the captured image so that it can recognize (i.e. classify) the user as a match to this image when a further image of the user is captured by a user engagement device/robot 8. Where an age/gender of the user is predicted, this information can be stored as user properties in association with the newly created user entry 128.

Figure 7:
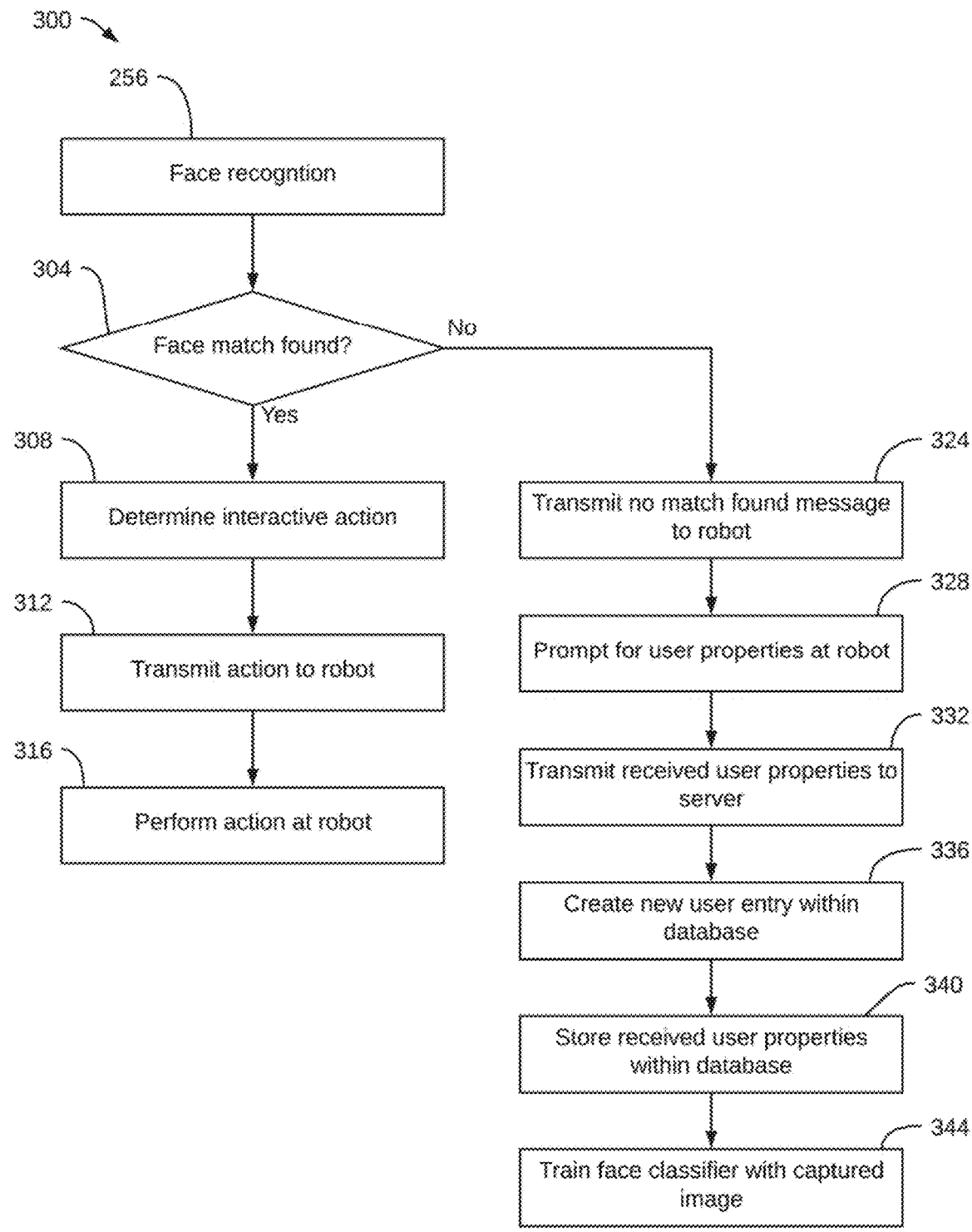
FIG. 7 illustrates a flowchart showing the operational steps of a method for determining an interactive action in response to applying face recognition according to an example embodiment.

Referring now to FIG. 7, therein illustrated is a flowchart showing the operational steps of a method 300 for determining an interactive action in response to applying facial recognition at step 256 of method 200.

At step 304, subsequent to applying the face recognition at step 256, it is determined whether a match of the captured image of the human user with one of the stored user facial images 136 has been found.

If a match has been found, the method 300 proceeds to step 308 to determine the interactive action to be performed by the user engagement robot to engage that user whose face had just been captured. As described elsewhere herein, determining the interactive action may be based on a current user characteristic, such as user emotion, determined from the face recognition of step 256.

At step 312, the interactive action that was determined is transmitted from the server 96 to the user engagement device/robot 8 that initially captured the image of the matching user.

At step 316, the interactive action is performed at that user engagement device/robot 8.

If a match is not found within face recognition step 256, the method 300 proceeds to step 324 to transmit a notification to user engagement device/robot 8 that initially captured the image of the matching user. The notification indicates that a user entry matching the human user whose face was captured has not been found. This also indicates that the user engagement device/robot 8 should perform an interactive action to receive information from the user.

At step 328, the user engagement device/robot 8 displays a message prompting the human user to provide information about themselves. The user entered information corresponds to user properties to be stored for that user.

At step 332, the user properties that are inputted by the human user via a user input device of the user engagement device/robot 8 are further transmitted from the user engagement device/robot 8 to the server 96.

At step 336, a new user entry 128 is created within the user database 120 of the remotely connected server 96. The captured image (ex: second processed image outputted by the image adjustment module 160) is also stored in association within the newly created user entry 128 as one of the user facial images 139 for that user entry.

At step 340, the user properties inputted by the human user and received from the user engagement device/robot 8 are also stored as user properties 144 in association with the newly created user entry 128.

At step 344, the face recognition module 184 is further trained with the captured image (ex: second processed image). This will enable the module 184 to learn this image and recognize the user as a match to this image next time this user's face is captured by the image capture device 56 of a user engagement device/robot 8.

It will be understood that the order of various steps of method 300 may be interchangeable.

According to various example embodiments the second set of processing steps related to facial recognition applied at the server 96 can determine at least one of an age, gender, and emotion of the face captured in the received first processed image and the interactive action is determined based solely on this age, gender and/or emotion. That is, an interactive action can be determined even though a match to the human face captured in the first processed image has not been found.

Returning to FIG. 1, the cloud robotics-based system can include a plurality of user engagement device/robot 8 each in communication with the server 96. Each user engagement device/robot 8 can operate independently of one another, such as each operating separately to interact with a respective user. However, each user engagement device/robot 8 exchanges data with the server 96 and tasks (ex: the second set of image processing steps) for a plurality of the device/robots 8 can be executed at the same server 96. These tasks can be executed in parallel at the server 96. Furthermore, the user database 120 of the server 96 is shared amongst the user engagement device/robots 8.

Advantageously, the cloud-robotics based systems and methods described herein allows for distributing the computing tasks related to face recognition between a user engagement device/robot 8 and server 96. By reducing the computational load at the device/robot 8 and having the server 96 perform more of the tasks, the hardware requirements (ex: computational power) and battery usage at the robot can be reduced. Accordingly, the user engagement device/robot 8 can act like a "thin" robot. The distributing of tasks has a latency cost since data must be transmitted between the robot and the server, but this latency can be controlled to be within an acceptable range.

Furthermore, distributing tasks to the server 96 allows increased scalability and upgradeability. In particular, the computing tasks are less constrained by the hardware (ex: computational power and battery usage) of the user engagement robot because more tasks are executed at the server 96. The server 96 can be more easily upgraded or scaled depending on the computational load (ex: using more robots within the system) or computational complexity (ex: advancements in AI, image processing that require more computational power).

The cloud-robotics based systems described herein further allows centralizing of information, such as information stored within the user database. This may permit easier data analysis (ex: big data), pattern recognition, and training of machine learning models.

Furthermore, the centralizing of information allows for easier sharing of information amongst the user engagement device/robot 8. For example, where a new user entry is created at a first user engagement device/robot 8 in response to a new human user, that user can then interact with any other user engagement device/robot 8 having access to the server 96 and that other device/robot 8 will be enabled to match the face of that human user. This is possible due to each device/robot 8 having access to the same centralized user database 120.

Various embodiments described herein is well suited for settings in which a human user will interact with an user engagement device/robot 8 and in which the user engagement device/robot 8 will provide an interactive response that is personalized to the human user. Furthermore, the interactive response provided by the user engagement device/robot 8 should be substantially automatic and require minimal input from the user. In particular, various embodiments described herein allows for automatic identification of the human user without the user having to actively provide user input to allow identification of the human user.

For example, in a typical operational environment, a human user will arrive within the field of view of the image capture device 56 of an user engagement device/robot 8. The user engagement device/robot 8 can be stationary within a public location, such as a commercial shopping centre, hotel, airport or the like.

Alternatively, the user engagement device/robot 8 can be moving about autonomously within the public location and the human user can walk up to the user engagement device/robot 8 to begin the engagement.

This action of stepping within the field of view can be detected as motion at step 218 (motion detection mode) of the face detection step 216 performed at the user engagement device/robot 8. Upon the motion being detected, the active face detection mode of step 222 is performed within the first face detection step 208. The first processed image corresponding to the face of the user is further transmitted to the server 96, whereby the identity of the user can be determined from the server side processing, namely the face recognition step 256. It will be appreciated that identification of the human user is carried out substantially automatically, and without the human user having to perform an active identification, such as providing a password or an identification token (ex: keycard).

The identification of the human user allows for accessing information about the particular user from the user database and to further determine at step 308 an appropriate interactive action based on this information. Accordingly, the information that is applied is personalized to the user.

An example of a typical use case involves a human user walking up to a user engagement device/robot 8 in an airport. The user engagement device/robot 8 confirms the identity of the user according to various example embodiments described herein and accesses information associated to the particular user ID within the user database 120. The user properties 144 can indicate that the user has checked into a flight leaving from gate number 10 and that the user previously purchased red wine from the duty free shop in a previous trip. In response to this information, it can be determined at step 308 that the determined interactive actions are to display options to "proceed to gate no. 10" or "visit the duty free shop". These actions are transmitted to the user engagement device/robot 8 at step 312. At step 316, the options are displayed on the display device of the user engagement device/robot 8 for selection by the user. Upon receiving a selection from human user (ex: proceed to gate no. 10), the user engagement device/robot 8 can further being a displacement towards the selected destination, which can assist the user reach the selected destination.

Another example of a typical use case involves a human user entering a retail store and being greeted by the user engagement device/robot 8. During the greeting, the face of the human user is captured and facial recognition is carried at step 256. If a face match is not found at step 304, the human user is invited to enter their registration information at the user engagement device/robot 8. This registration information along with the face of the user is stored within user database 120. Upon the human user entering the same retail store at a later date, the user engagement device/robot 8 will then be able to identify the user and provide a personalized interactive action (ex: displaying the message "Welcome Back Jane! It was recently your birthday, and you have a free birthday gift awaiting you at the counter").

Experimental Setup

According to an example experimental setup, a light face detector is utilized on the robot side to discard all non-face segments of the input image. The light face detector of the experimental setup is used for detecting all possible face images within the input RGB image. The detected face images are then cropped from the input image, re-sized to a predefined size and transmitted to the cloud for the further process. Despite the simplicity, the light face detector is tuned to minimize the chances of missing any valid face images for the price of false detection of some non-face images.

Figure 8:
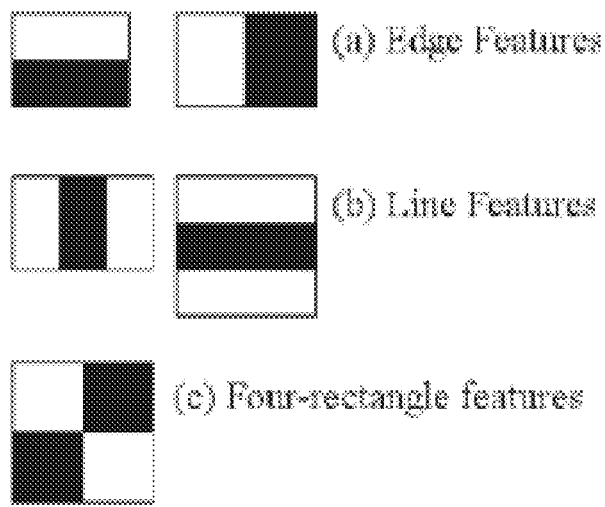
FIG. 8 illustrates convolution kernels used in the light face detector of an example experimental setup.

The experimental setup light face detector is trained on a large dataset consisted of face and no-face images. All incoming RGB images, with arbitrary size, are first resized to VGA size and a set of rolling search window with different sizes then slides over the image to extract the potential face images using the trained classifier. FIG. 8 illustrates convolution kernels used in the light face detector.

According to the example embodiment, the high frequency white noise, modulated in the images grabbed by the camera is filtered first. Then one of the filtered images that contain the background, solely, is selected as the reference frame. All incoming filtered images are then subtracted from the reference image. If a significant change above a threshold is detected, the motion detector output is triggered.

Referring to FIG. 20, a chart shows CPU usage for motion detection versus face detection.

| Setup | | | Light face detection | | | | Motion detection | |
| --- | --- | --- | --- | --- | --- | --- | --- | --- |
| Size of image | FPS | CPU spec. | scale_factor | min_neighbors | min_size | cpu usage | cpu usage | version |
| 300 × 200 | 5 | 1 core 2.6 GHz | 1.2 | 5 | 60 | 31% | 3.5% | 0.0.1, 0.0.2 |

A sequence of images, obtained in real-time from the robot's camera, are classified by the light face detector for inclusion of potential face images.

The tests were done using 2 types of companion computers, an Odroid XU4 and the RPI 3. Odroid XU4 CPU is Samsung Exynos5422 Cortex™ A15, with 2 GHz and Cortex™-A7 Octa core CPUs. The RPI 3 CPU is Quad Core 1.2 GHz Broadcom BCM2837 64 bit four core CPU. Both of these computers running the same code, same camera (Logitech) but different face detection versions, the loop time of the algorithm was fixed to 5 frames per second (this means slowing the algorithm) and variations where done to size of the image and to the cascade classification algorithm.

For the CPU usage, the "psutil" python module was used in order to avoid running other commands (like "top") on the host computer, it also help in order to standardize the tests. The results of this analysis are presented in Table below. There are three parameters that should be adjusted in the light face detector to achieve more accurate results, i.e. scale factor, minimum neighbors, and minimum size which are mentioned in this table in columns 3-5. Adjusting these parameters to obtain the semi-optimal results is an experimental practice.

TABLE 1

Performance Analysis of Light Face Detection

| Computer | Width (pixel) | Scale Factor | min Neighbors | min Size | Total CPU (%) | Top (CPU % per Processor) | FPS (real) |
|---|---|---|---|---|---|---|---|
| Odroid | 400 | 1.3 | 5 | 60 | 17.6 | 30.8 | 5 |
| XU4 | 640 | 1.3 | 5 | 60 | 18.5 | 63.2 | 4.9 |
| OpenCV | 400 | 1.1 | 6 | 30 | 29.0 | 127.2 | 4.8 |
| ver. 3.2 | 640 | 1.1 | 6 | 30 | 60.1 | 317.2 | 4.2 |
| RPI 3 | 400 | 1.3 | 5 | 60 | 24.0 | 98.8 | 3.1 |
| OpenCV | 640 | 1.3 | 5 | 60 | 26.1 | 100 | 1.4 |
| ver. 2.4 | 400 | 1.1 | 6 | 30 | 26.8 | 100 | 0.8 |
|  | 640 | 1.1 | 6 | 30 | 27.3 | 100 | 0.3 |

Figure 9:
FIG. 9 are samples outputted by the light face detector of the experimental setup.

The output of this block is extracted as two different image sets, for experiment purposes: 64×64 pixels and 128×128 pixels and each set is fed into next block independently. FIG. 9 represents some output samples of this block. As depicted here, some output images are false positives.

The face verification module of the experimental setup (the second face detection) is used for verification of the possible face images detected, resized and streamed by the light face detection module on the robot side. The goal of this module is to maximize the precision by detecting and discarding all non-face images, falsely detected as faces in the light face detection module. Consequently, both light face detection and face verification modules maximize the accuracy, collaboratively, as the former module maximizes the recall and the later maximizes the precision. Three different methods of face detectors are proposed and tested for this module.

Light face detector: This method uses the same module used in the robot side with more conservative settings.

Cascade face detector: This method uses a cascade kernel to extract a set of features from each extracted window and classify it as face or no-face based of this set of features.

Face verification: This module is implemented in C++ and optimized to run fast. This module is coupled with a multi-scale searching window sweeping the whole image to detect any possible frontal face images.

Main goal of the face verification section is to remove the false positive images received from the robot side as potential face images. To that end, the parameters of the face verification module are setup such that the precision and accuracy of the face detection are maximized. In this investigation, three goal functions are considered as the precision, recall, and accuracy, where they are defined as follow:

$$\text{Precision} = \frac{TP}{TP + FP}$$

$$\text{Recall} = \frac{TP}{TP + FN}$$

$$\text{Accuracy} = \frac{TP + TN}{TP + TN + FP + FN}$$

where TP is True Positive, which it means the image has a face and it is recognized as a face image. FP stands for False Positive, which means the image does not include a face but it is recognized as the image of a face. Similarly, FN and FP are stand for False Negative and False Positive.

A total of 326 images consisted of 273 face and 53 no-face images are used in this section for the examination of this module. Each set is tested with two first classifiers and the results are compared.

The results are provided in terms of Precision, Recall and Accuracy. The Table below represents the parameter set-up values and the results of this experiments.

As this table presents, variations in scale factor, minimum number of neighbors and minimum size can change the accuracy and precision considerably. For instance, using the light face detector of the experimental setup and images with 128×128 pixels, if the scale factor is set to 1.05 and the minimum neighbors and size are, respectively, set to 12 and 30, the precision and accuracy achieve approximately 0.87 and 0.85, respectively. However, if the scale factor is changed to 1.19, then the accuracy is degraded by 17.3%; however, the precision is improved by 12.6%. The table also demonstrates that with scale factor=1.19, there is no FP in the output of face verification, but the number of FN (the images including a face which are recognized as no-face image by the light face detector the experimental setup) is increased dramatically from 10 images to 96 images. There is a trade-off between accepting as much as possible more face images versus accepting the no-face images; i.e. finding the sub-optimal values for precision vs. accuracy.

TABLE 2

Performance Analysis of Face Verification

|  |  |  | Scale Factor | min Neighbor | min Size | TP | FP | TN | FN | Precision | Recall | Accuracy |
|---|---|---|---|---|---|---|---|---|---|---|---|---|
| Light face detector | 64 | Pixels | 1.059 | 6 | 30 | 210 | 8 | 45 | 63 | 0.9633 | 0.7692 | 0.7822 |
|  |  |  | 1.059 | 5 | 30 | 227 | 17 | 36 | 46 | 0.9303 | 0.8315 | 0.8067 |
|  |  |  | 1.04 | 12 | 1 | 195 | 0 | 53 | 78 | 1 | 0.7143 | 0.7607 |
|  | 128 | Pixels | 1.05 | 12 | 10 | 264 | 38 | 15 | 9 | 0.8741 | 0.9670 | 0.8558 |
|  |  |  | 1.05 | 12 | 30 | 263 | 38 | 15 | 10 | 0.8738 | 0.9633 | 0.8528 |
|  |  |  | 1.19 | 12 | 30 | 177 | 0 | 53 | 96 | 1 | 0.6484 | 0.7055 |
| Cascade face detector | 64 | Pixels | 1.001 | 1 | 1 | 2 | 0 | 53 | 271 | 1 | 0.0073 | 0.1687 |
|  |  |  | 1.01 | 1 | 1 | 1 | 0 | 53 | 272 | 1 | 0.0037 | 0.1656 |
|  |  |  | 1.0001 | 1 | 1 | 2 | 0 | 53 | 271 | 1 | 0.0073 | 0.1687 |
|  | 128 | Pixels | 1.01 | 5 | 30 | 261 | 0 | 53 | 12 | 1 | 0.9560 | 0.9632 |
|  |  |  | 1.01 | 4 | 30 | 265 | 2 | 51 | 8 | 0.9925 | 0.9707 | 0.9693 |
|  |  |  | 1.005 | 4 | 30 | 269 | 10 | 43 | 4 | 0.9642 | 0.9853 | 0.9571 |

In Cascade face detector the experimental setup, using data set of 128×128 pixel images, with scale factor of 1.01 and min neighbor and size of 4 and 30, the precision is 0.99 and accuracy is approximately 0.97. However, using the other data set, these functions are changed dramatically, considering the variations in other two set-up parameters. In this scenario, the precision will be maximum (it means 1), however the accuracy highly degrades to 0.17. Also, the number of images which are TP are decreased from 265 to 1, which is very low performance for a cascade.

Figure 10:
FIG. 10 are samples outputted by the second face detector of the experimental setup.

The Cascade face detector experimental setup outperforms light face detector of the experimental setup using higher resolution images; its precision and accuracy are, respectively, 14.4% and 13.3% higher than light face detector of the experimental setup. Cascade face detector of the experimental setup can recognize almost the same number of images as the light face detector of the experimental setup with no FP outputs. Light face detector of the experimental setup can also be recommended method if the image resolution is low; the parameter set-up for such a scenario is as scale factor=1.059, min neighbors=6 and min size=30. This way, the precision and accuracy both are reasonably high enough to be used for face verification block. The recommended solution for face verification section is the first row of Cascade face detector of the experimental setup for 128-pixel images, i.e. scale factor of 1.01, minimum neighbors and size of 5 and 30, respectively. This is the approach which can filter the no-face images from the data set and send it to the face filtering section. The outcomes of this section, are applied to the data set of FIG. 10.

The experimental setup includes a face filtering module, which combines the image adjustment and the quality evaluation. This module is designed and added to the process to maximize the accuracy of the face recognition task by first normalizing, adaptive histogram equalizing, the face images received from the face verification module and then tested for sharpness and completeness. Blurred or incomplete face images, with less than a pair of eyes and a nose, are discarded. The passed face images are then aligned and submitted to the face recognition classifier for either training or evaluation.

Image blur is one out of many generated artifacts by camera sensors in computer vision. This artifact is caused by either out of focus camera lens, motion blur and saturated lighting in the scene. Image blur reduces the sharpness of the primal features, mainly the edges, corners and ridges, and have a direct deterioration effect on most of the computer vision tasks such as the face recognition. In the experimental setup, the input images are scored by the degree of blurriness using the variance of the Laplacian calculated for each image. The images are then removed from the training set in the training phase of the face recognition by thresholding the calculated scores (a link to the face recognition).

Blurriness Filter

Figure 11:
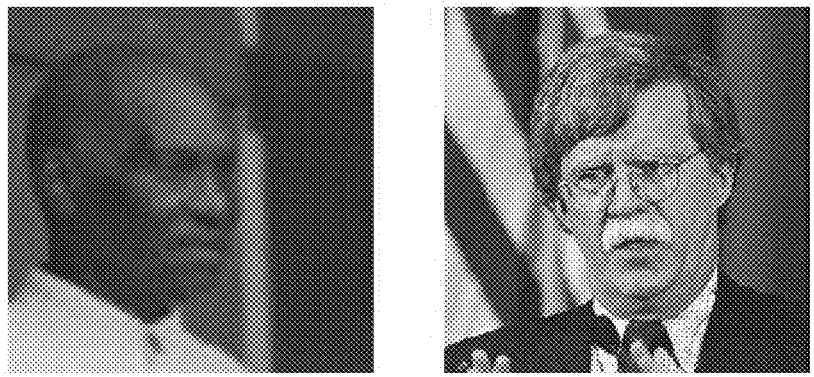
FIG. 11 shows the blurriest and sharpest images of a dataset of images used within the experimental setup.

The data set used at this stage to mimic the sequence of images received from the robot, is the LFW (Labeled Face in the Wild). This data set includes photos of 5749 individuals, some only have 1 photo and some have more (George W Bush with 530 photos). The images are RGB, each with the size 250×250 pixels. The face of each individual is always in the center of the photo. For the face recognition task the face of each person is used only and the rest of the image is discarded. FIG. 11 shows the blurriest and the sharpest images in the data set, sorted by the scores obtained from the variance of the Laplacian.

The code calculates a score per image, representing the sharpness of each image. The output is provided in a score vector, where each element of this vector represents the sharpness score of each image in the data set.

$$v_{score}^T = [score_1, \ldots, score_{N\ images}].$$

Laplacian at every location, P(x,y) on the image, I(x,y), is the sum of the second order spatial derivatives in both x and y directions.

$$L(x, y) = \frac{\partial^2 I}{\partial x^2} + \frac{\partial^2 I}{\partial y^2}.$$

In practice, this measure is calculated using two similar kernels in FIG. 12, by convolving the image to one of these kernels. In order to design a robust filter, a Gaussian kernel is used to remove any white noises from images, by convolving a Gaussian kernel to the Laplacian kernel of FIG. 13. FIG. 14 represents the response of the Laplacian-Gaussian kernel in response to an edge. The Laplacian-Gaussian of an image is with the same width and height of the original image, LoG(x,y). The variance of Laplacian-Gaussian is a measure for the sharpness of the image used in computer vision. This filter is implemented in OpenCV and is available in python.

Completeness Filter

The Facial completeness module of the experimental setup is used to detect two eyes and a nose within each verified face image. Faces with less or more than pair of eyes and a nose are filtered, either due to occlusion or multiple faces in one frame. This filter ensures that the classifier is not trained with incomplete faces, which deteriorate the classifier otherwise.

Image Normalization

It is crucial to keep the lighting contrast of the face images as similar as possible during the training and recognition process. Often, it is impractical to fixate the lighting condition during the process. To that end, a software lighting correction method is utilized to serve the purpose. An Adaptive Histogram Equalization method is used herein. At each window on the image the contrast of the intensity profile is normalized in order to get an equalized histogram for the new intensity values. This unifies the lighting condition of the face images and improves the classification accuracy.

Alignment

Another important pre-processing process on the face images is the alignment of the faces in order to unify the position of the eyes and nose in the image. This in turn plays a role in improving the accuracy of the classifier. In case of a complete face, a landmark locator is used to locate the center of the eyes in the face images. The face is rotated using the OpenCV affine transformation library so that the baseline connecting two eyes become parallel to the x axis.

Evaluation of Face Filtering

Figure 15:
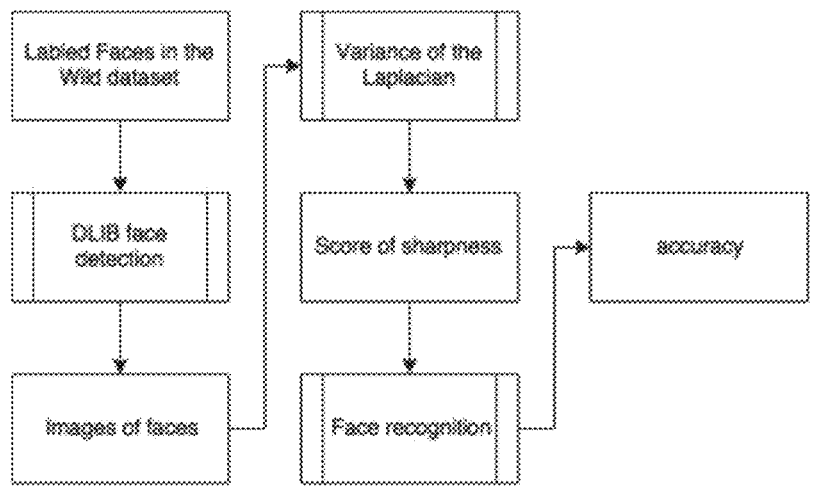
FIG. 15 is a schematic diagram of a first setup of the experimental setup.
Figure 16:
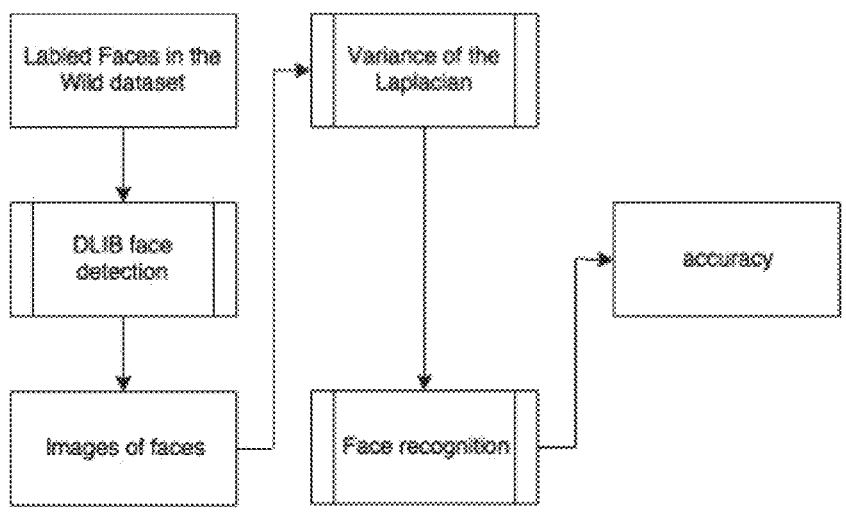
FIG. 16 is a schematic diagram of a second setup of the experimental setup.

The variance of the Laplacian is used as a module in the face recognition task. To see and test the effect of considering the filtering module, two setups presented in FIGS. 15 and 16 without the filtering module, respectively.

In the first setup with the filtering, some of the images in the data set, with sharpness scores lower than a threshold, are discarded and then the face recognition classifier is then trained. The accuracy of the classifier is then presented for different values of the threshold. In the second setup, the sharpness filter is removed and the face recognition is trained and tested for the whole dataset. The table below represents the classification accuracy, precision and recall of the experimental setup over a test set randomly chosen from the labeled faces in the wild (LFW) dataset for four different scenarios of filters, (aligned and normalized), (unaligned and unnormalized), (aligned and unnormalized), and (unaligned and unnormalized with 5% rejection rate).

| | | accuracy | precision | recall | removed pix |
|---|---|---|---|---|---|
| aligned and normalized | no filter | 80.1% | 87.4% | 61.9% | −2% |
| | completeness | 79.9% | 87.6% | 61.5% | −10% |
| | blurness | 80.4% | 87.7% | 62.7% | −4% |
| | complete + blur | 80.4% | 87.9% | 62.5% | −12% |
| unaligned and unnormalized | no filter | 81.0% | 87.1% | 64.9% | 0% |
| | completeness | 83.5% | 89.7% | 67.1% | −27% |
| | blurness | 84.0% | 88.4% | 65.5% | −46% |
| | complete + blur | 86.8% | 91.2% | 70.2% | −60% |
| aligned and unnormalized | no filter | 81.6% | 90.0% | 64.1% | −1% |
| | completeness | 84.6% | 92.5% | 68.7% | −27% |
| | blurness | 83.1% | 90.1% | 62.7% | −47% |
| | complete + blur | 86.7% | 93.0% | 69.9% | −60% |
| unaligned and unnormalized percent sharpness | no filter | 80.3% | 87.9% | 62.6% | 0% |
| | completeness | 81.2% | 88.8% | 64.0% | −5% |
| | blurness | 81.5% | 88.4% | 64.4% | −5% |
| | complete + blur | 82.3% | 88.8% | 65.7% | −10% |

Features are the representatives of the face images. Not all of the pixel values in a face image contribute to discriminating between faces and only some of them contribute to the task. There are two types of features extraction approach for face recognition which are available at the moment with the current algorithm and used within the experimental setup.

Face feature extraction of the experimental setup: This is a neural network based algorithm trained on a large annotated facial data set to be able to extract features with the maximum discrimination capability.

During the training beside an image, the location of the face are also provided as the labels. The trainer then tries to maximize the output probability of the correct class (each person is a class) and minimize the wrong classes by changing the parameters of the neural network.

This classifier has a high performance because the features generated from images of the same person are similar while the features of the faces of different people are very different. Thus, the method is capable to distinguish different people with high probability. The neural network used in face feature extraction is using about 32 million weights which besides its high accuracy makes is demanding on CPU/GPU.

Rotation-scale invariant features: This method is consisted of two parts. The first part finds the best key-point candidates for feature extraction based on their local gradient strength. Then, it applies Harris corner measure to find top N points among them. It also uses pyramid to produce multiscale-features. To compute the orientation, the intensity weighted centroid of the patch with located corner at center is computed. The direction of the vector from this corner point to centroid gives the orientation. The best candidate key-points with the strongest features are then fed to second part of the method to extract descriptors with many modifications to enhance the performance. It calculates rotational invariant feature vector for each key point.

This method is fast to compute; also, it is light and less demanding on CPU/GPU. However, it is less robust in discriminating between classes compared to the face feature extractor of the experimental setup. As a result, the features extracted from face images of the same person are more diffused in the cluster, as a result, features of the face images from different people are less discriminant.

Two setups are used herein to report the performance of the classifier using the rotation-scale invariance face features.

Setup 1

Figure 17:
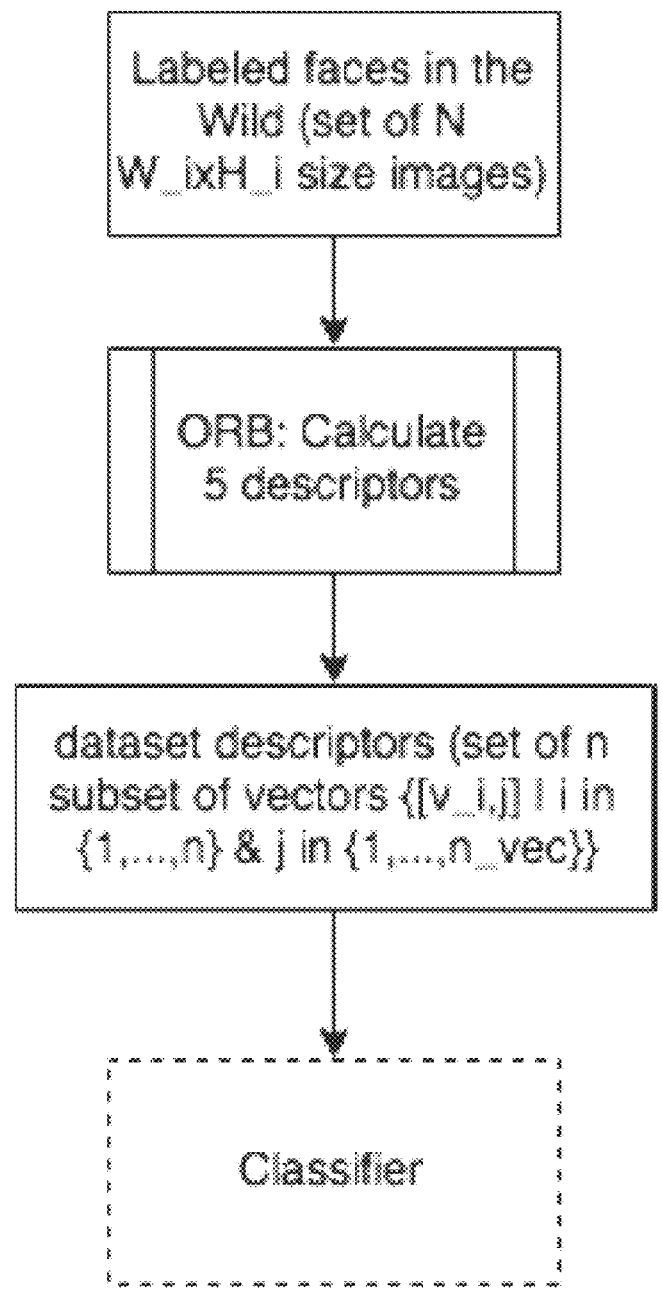
FIG. 17 is a schematic diagram of a first setup for facial feature extraction of the experimental setup.

Setup 1 (illustrated in FIG. 17) uses the labeled faces in the wild data set for this purpose as input. The rotation-scale invariance face method selects and extracts 5 features from each face within each image. Now the data set is transformed into a data set of a feature vector (consisted of 5 concatenated vectors) per person. The features data set is then fed into the classifier (face recognition) part.

Setup 2

Figure 18:
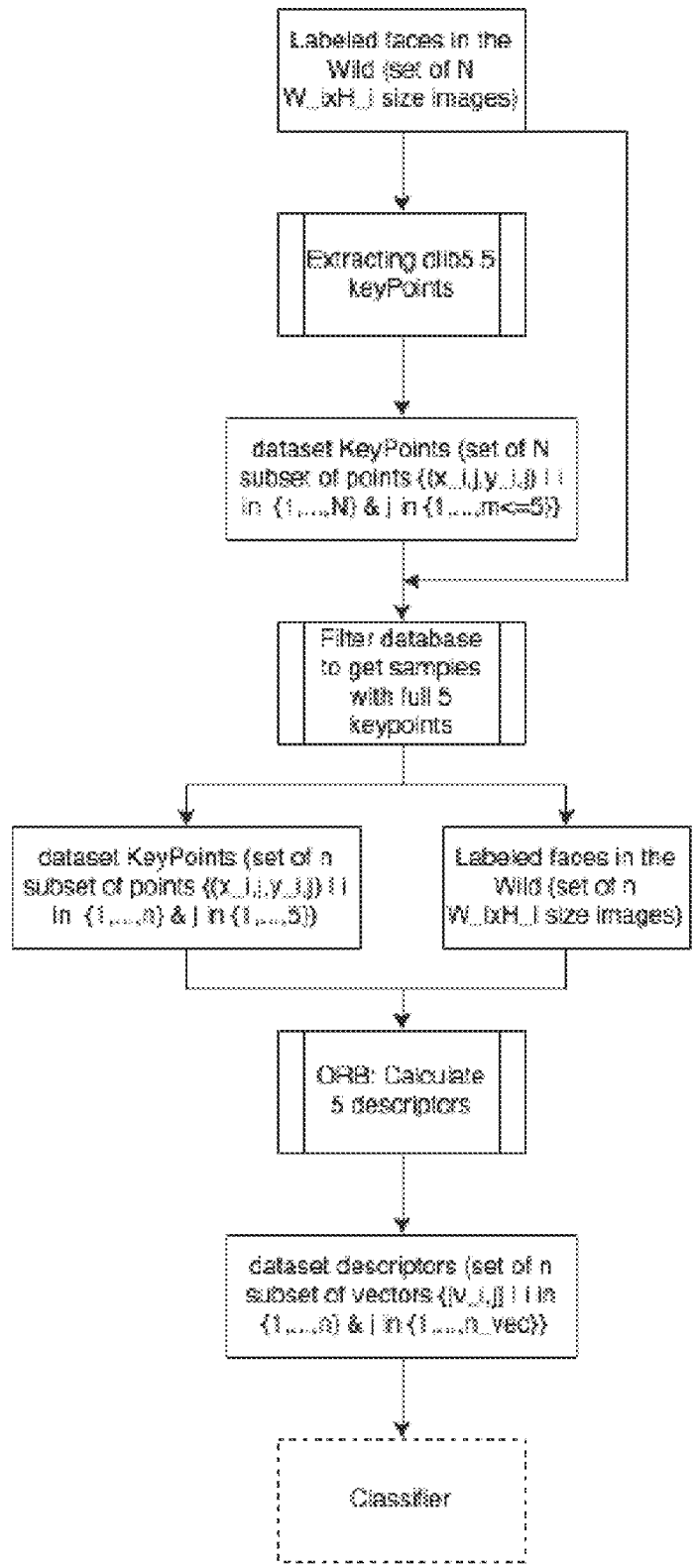
FIG. 18 is a schematic diagram of a second setup for facial feature extraction of the experimental setup.

Setup 2 (illustrated in FIG. 18) uses the labeled faces in the wild data set for this purpose as input. Five facial landmarks are used to localize 5 key-points on the faces (left and right margin of both eyes and the tip of the node) and then for each key-point the features vector is calculated using this method. Now the data set is transformed into a data set of a feature vector (consisted of 5 concatenated vectors) per person. The features data set is then fed into the classifier part.

Performance Analysis

The data set applied to this two setups and the results are depicted in Table below. As this table demonstrates, when the key points are extracted by feature extractor of the experimental setup, the performance of the feature extraction section, in terms of accuracy, is improved by more than three times. Furthermore, the feature extractor of the experimental setup feature extraction method seems to have a Superior effect on the classification performance. In the current version of the Engage, this features are used for Face Recognition.

TABLE 3

Performance Analysis of feature extraction

| | Feature Extractor | | | |
|---|---|---|---|---|
| Setup | Key Points | Descriptor | Classifier | Accuracy |
| 1 | Rotation-scale invariance | Rotation-scale invariance | SVM/NN | <10% |
| 2 | Engage face features | Rotation-scale invariance | SVM/NN | <42% |

Age/Gender and Emotion Prediction

The prediction of age and gender within face recognition uses a deep neural network to estimate the age and gender. The input is the captured image of a face after image adjustment and the output is a decimal number indicating age (ex: 26) and a gender (ex: male or female).

The prediction of emotion within face recognition also uses a deep neural network to predict the emotion. A threshold may be predefined for each emotion. An input is the captured image of a face after image adjustment and the output is an array of numbers (floating point values) each corresponding to an emotion. In the experimental setup, 7 emotions are detected ['Angry', 'Disgusted', 'Fearful', 'Happy', 'Sad', 'Surprised', 'Neutral'], which may be output defined numerically as [0.02669518[0.01578433 0.01101593 0.6380721 0.04502084 0.01270925 0.25070238] in one example.

A Further Face Detection/Facial Recognition Method and System

Figure 19:
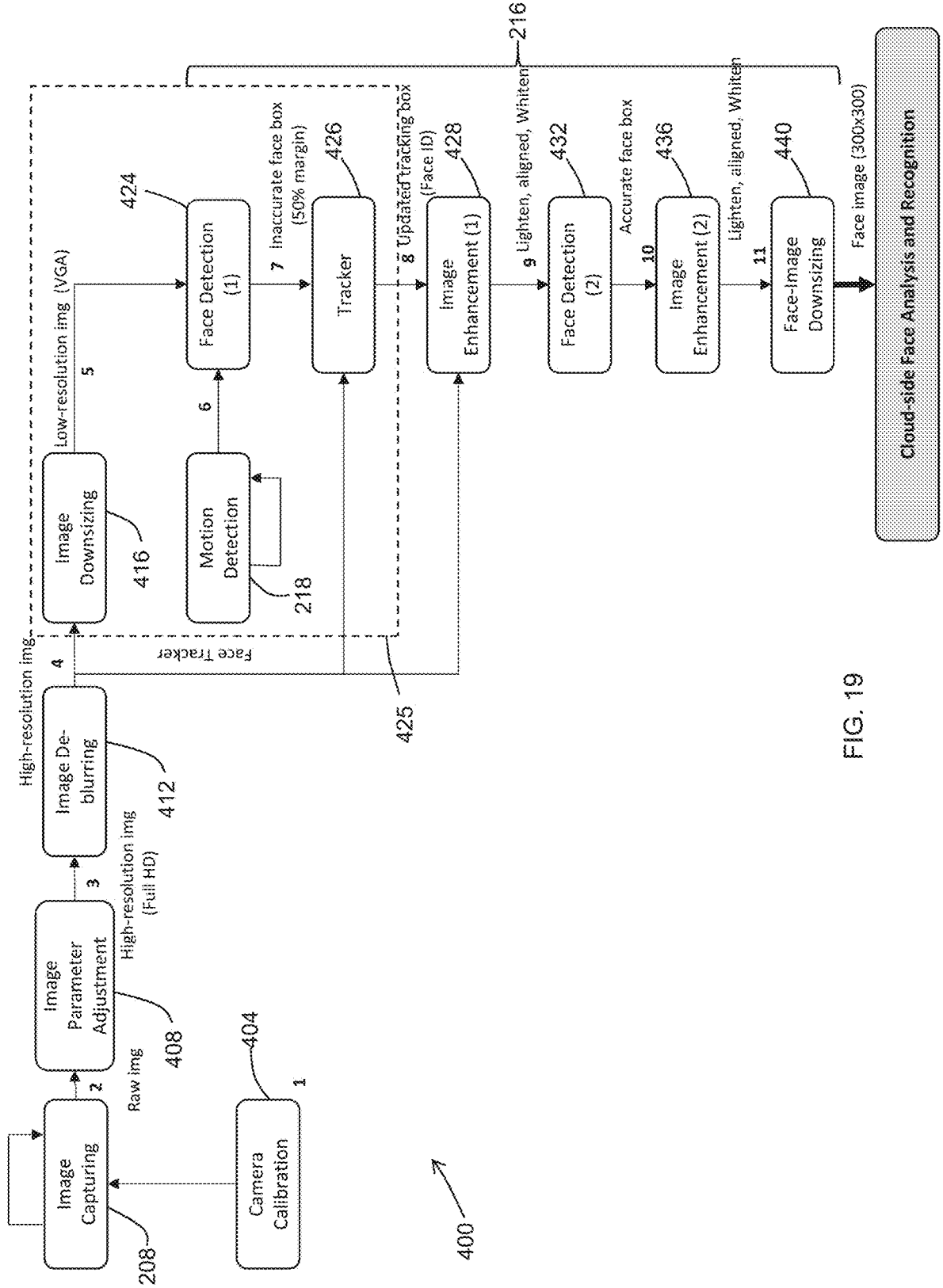
FIG. 19 is a schematic diagram of steps of a method applied to the captured image for face detection on the robot side and for outputting a first processed image, according to a further embodiment of the user engagement device/robot.

Referring now to FIG. 19, therein illustrated is a schematic diagram of steps of a method 400 applied to the captured image to selectively output at least the first processed image according to an example embodiment. The steps of FIG. 19 can represent a more detailed method of applying the first face detection carried out at the user engagement robot 8. The steps of FIG. 19 can be considered as an alternative or an improvement to the first face detection step carried out at steps 208 and 216, and as illustrated in, and described with reference to, FIGS. 3 and 4. It will be appreciated that the first face detection method 400 illustrated in FIG. 19 shows a complete embodiment, but that in various embodiments, one or more steps are optional or can be omitted. Moreover, it will be appreciated that the image processing method 400 causes certain processing steps to be moved onto the user engagement robot 8, thereby reducing or eliminating the need to performing such steps at the server 96. While this can increase the processing load on the robot side, it can also increase accuracy at the device/robot 8 (ex: more accurate face detection), which can decrease the number of images transmitted to the server 96, thereby reducing the bandwidth requirements.

At step 404, a camera calibration is carried out. It was observed that the spatial distortion of the raw images, grabbed by the camera can potentially influence almost any image processing tasks that is carried out, including AI tasks such as face recognition. The camera calibration step 404 seeks to avoid any degradation of the results and disruption in any of the following modules along the image processing/AI chain (ex: first face detection 222, second face detection 224, face evaluation 240, facial feature extraction 248 and/or face recognition 256).

The camera calibration at step 404 involves three main steps as follows:
1. capturing images using the image capture device 56 of a printed checkerboard pattern held in different orientations and positions in front of the image capture device 56;
2. detecting the checkerboard pattern in the captured images;
3. refining the camera 8-parameters to achieve the least distorted checkerboard plane, iteratively.

The sizes of the squares and the printed checkerboard are known.

It will be understood that the camera calibration step 404 is carried out as an initial calibration step or as an occasional re-calibration step and that the step is not carried out in every instance of the cloud robotics-based face recognition method 200.

Accordingly, once the image capture device 56 is calibrated and during an instance of the cloud robotics-based face recognition method 200/400, an image of a scene is captured using the image capture device 56 of the user engagement robot 8 at step 208 (as described herein with reference to FIGS. 3 and 4).

At step 408, a color transformation function is applied to the image(s) captured at step 208. The color transformation function maps the colors of captured image to normalized color space for use in subsequent steps of the face recognition method 200. The transformation function 408 is applied due to different manufacturers of image capture devices having slight variations in color when capturing an identical scene. The requisite transformation function 408 can be determined by calibrating color response of the image capture device 56 from captured images of a standard 24 color checker board, or the like. It will be understood that the color transformation function 408 is applied where it is expected that the subsequent steps of method 200 are to be applied using different image capture devices 56 having different color responses. However, where the manufacture of the image capture device 56 and its color response is known, subsequent steps of method 200 may be adapted to that color response, thereby eliminating the need for step 408 for the given specific manufacture of image capture device 56.

Beside the spatial intrinsic parameters, cameras also have a set of parameters to adjust the color-space response of the sensor. On the image frame of the camera the RGB digital sensors are used to register the red, green and blue spectrum of the input light passed through the lens targeting a specific 2D solid angle part of the 3D scene. The frequency response of the color image sensors is different, hence, the generated RGB image from different cameras have different color-wise appearance. In 1970's the HSL (hue, saturation and lightness) and, later evolved to, HSV (hue, saturation and value) color space was designed and used afterwards to represent the human perception compatible color-space. Initially three linear equations of the RGB response is used to convert RGB images, grabbed by the image digital sensors, to HSV color-space on the fly. The 9 parameters of the set of linear equations are always calibrated by camera manufacturers for a constant light across the scene and a specific range of registered light for the maximum HDR range of the sensors. However, this basic conversion does not guarantee different cameras to generate an identical image from a scene due to non-stationary light distribution over the scene. Nonetheless, adjusting the color-space conversion on the fly, moreover, locally on the image sub-sections is necessary for computer vision applications such as face-recognition, where, the reference face image is grabbed by one camera and is due to be recognized by another. Adjusting the color constancy of the image capturing devices is one of the essential steps in image processing. A canonical approach to calibrate the color response of the camera is by using a standard 24 ColorChecker board. Few snapshots of the ColorChecker are captured at different locations in front of the camera. Next, within the captured images, the average RGB color of each cell in the ColorChecker should be equal to the reference nominal color values of that cell, provided along with the ColorChecker. Ultimately, a transformation function is trained to map the colors of the images captured by the camera to the corresponding approximated RGB values At step 412 a step of de-blurring the image may be optionally carried out. The blurring of an image is typically simulated as the convolution of a point spread function (PSF) to an image. Accordingly, the deblurring can be carried out by iteratively estimating a PSF and applying a de-convolution using the PSF until a sharper is obtained. A Gaussian form of PSF function is generally considered for representing the out-of-focus and low-resolution blurring. For motion blur, such as found in videos, an optical flow that defines the motion can be estimated by comparing consecutive frames and the optical flow can be used to formulate the form of the PSF function.

At step 416, the captured image can be down-sampled or downsized to have a lower resolution, such as a VGA resolution. It will be appreciated that a lower resolution can decrease the computational load of the motion detection and first face detection steps applied to these images.

At step 218, motion detection is applied to the down-sampled image. The motion detection can be carried out by comparing successively captured images and measuring a metric of changes between the images. If the metric of changes exceeds a given threshold, motion is detected.

As described with reference to FIG. 4, the step 222 of active face detection is carried out on captured images upon detecting motion in the captured images. The logical flow between motion detection 218 and active face detection 222 as described with reference to FIG. 4 is applicable to the method 400.

According to one example embodiment, and as illustrated in FIG. 19, multiple iterations of the first face detection can be applied on different images of an image scale pyramid at the user engagement robot 8. That is, the face detection iterations are applied on images of successively higher resolution. In the example illustrated in FIG. 19, two successive iterations, at steps 424 and 432, of face detection are carried out on the user engagement robot 8.

At step 424, a first iteration of the robot-side first face detection 216 is carried out. It will be appreciated that the first iteration of this first face detection at step 424 is carried out on the downsized (step 416), deblurred (step 412), color transformed (step 408) image that was captured by the calibrated image capture device 56.

In a preferred embodiment, the first iteration of the robot-side first face detection at step 424 is carried out using a customized multi-task cascaded convolution network algorithm. (MTCNN) applied to the captured image downsized at step 416.

If a face is detected in the first iteration of the robot-side first face detection at step 424, an image sub-area corresponding to the location of a face detected by the first iteration of the first face detection (i.e. a face box) is outputted. Due to the first iteration being applied to a downsized captured image, the accuracy of the detection is lower than if the face detection were to be applied to a full resolution image.

As part of the first iteration of the face detection, a filtering sub-step is applied to filter out images in which a face is detected but that have a low confidence of the detection. That is, in one example embodiment, the filtering sub-step returns one or more image subareas corresponding to a detected face and a confidence of detection metric for each of the detected subareas. Subareas having a confidence of detection value falling below a predetermined threshold are ignored and further processing (either on the robot-side or the server side) is not applied to these subareas.

According to one example embodiment, the confidence of detection metric provides an indication of blurriness of the sub-area corresponding to a detected face. To measure blurriness, the standard deviation of the Laplacian of the face image is compared to an adaptive threshold that is a function of the illumination of the image. The function for determining the adaptive threshold can be obtained from a model pretrained from a custom dataset.

It will be appreciated that filtering detected sub-areas having low confidence values manages the number of sub-areas corresponding to detected faces that need to be further processed. This management avoids excessive further processing at the user engagement robot 8 and the number of face images sent to the server 96 for further server-side processing, which further manages bandwidth usage at the user engagement robot 8.

Continuing with FIG. 19, according to the illustrated example, tracking is applied at step 426 to the sub-areas detected at the first iteration of the face detection step 424. The tracking step 426 outputs, for each sub-area corresponding to a detected face, an expected location of the same detected face in a subsequently captured image of the same scene. It was observed that repeatedly performing face detection on every captured full-sized image is very computational heavy, with the computation time of face detection being approximately linearly proportional to the size of the area of the image (in pixel square units) to which the detection is applied. Applying tracking allows for reducing the area to which face detection is to be applied to a subsequently captured image since the detection is only applied to the expected location as determined from the tracking.

According to one example embodiment, a face tracker includes four blocks, which together form a face tracking step 425. The four blocks are as follow:

Image downsizing block (step 416): This block downsizes the captured image can be down-sampled or downsized to have a lower resolution, such as a VGA resolution. It will be appreciated that a lower resolution can decrease the computational load of the motion detection and first face detection steps applied to these images.

Motion detection block (step 218): This block receives input images at time to from the down-sizing block and detects motion based on average variation of the pixel values in time. This block is computationally least expensive compared to the other ones, hence the $t_{motion}$ associated with it is also fairly small. The output of this block is an unmasked area on the image representing a potential place for applying the further face detection process.

Face detection on motion areas (step 424): Given the processed image by the motion detection block, $t_0$, and the current time is at $t_0+t_{motion}$, this block will run face detection over the motion areas only. This saves computation power in two folds, temporal and spatial. In time the detector is not applied to the no-motion images. Spatially, the face-detector is not applied to the no-motion regions. After applying the face detection to the motion regions, a detected set of faces $F=[x_i, y_i, w_i, h_i, t_0) | i \in [1, \ldots, N_{faces}]]$ at the current time $t_0 + \Delta t_{detect-motion}$.

Tracker block (step 426): The tracker block receives a list of faces to track from the face detection on motion area block detected on the image grabbed at time $t_0$ and seek to find the faces on the image grabbed at time $t_1 = t_0 + \Delta t_{detect-motion}$. It is assumed that a constant maximum velocity for human in (fraction of face width/height)/seconds units, is applicable to move between frames. It is also assumed that a constant minimum search distance in fraction of face width/height units is applicable.

$$xsearch_{t_1} = x_{t_0} - \frac{((t_1 - t_0)v_{human} + \Delta x_{face}) \times \text{width}}{2},$$

$$ysearch_{t_1} = y_{t_0} - \frac{((t_1 - t_0)v_{human} + \Delta y_{face}) \times \text{height}}{2},$$

$$wsearch_{t_1} = ((t_1 - t_0)v_{human} + \Delta x_{face}) \times \text{width},$$

$$hsearch_{t_1} = ((t_1 - t_0)v_{human} + \Delta x_{face}) \times \text{height},$$

where, xsearch, ysearch, wsearch and hsearch are the beginning x, y, position, width and height of the search box. Using this search box, a secondary tracker face detector can be applied. Since the size of the search box is shrunken, the detected faces are achieved at a much smaller delay time, $\Delta t_{tracker} << \Delta t_{motion} + \Delta t_{detect-motion}$. The tracker block corresponds to a specific tracking step 426 within the face tracker 425 that receives the sub-area(s) identified by the first iteration 424 of the first face detection and predicts, for each received currently sub-area, a next sub-area of the subsequently captured image that will have a face corresponding that currently received sub-area.

Continuing with FIG. 19, at step 428, a first iteration of image enhancement is applied to each sub-area corresponding to a face detected from the first iteration of the first face detection step 424. The first iteration of image enhancement seeks to adjusting the lighting within each sub-area. For example, the contrast of the face image is adjusted to an average face contrast value. The average face contrast value can be determined by calculating an average contrast value from a data-set of face images. The first iteration of image enhancement can be applied to each sub-area of the high-resolution captured image that corresponds to a face detected from the first iteration. Each such sub-area can include the sub-area of a face detected from the first iteration of the first face detection step 424 plus a region of the image surrounding that sub-area.

According to one example embodiment, in order to have a good lighting in the detected face images, the contrast of each dark face image is adjusted by first converting it into YUV and then adjusting the range of the first channel (gray-scale lighting part of the face image). The variance and mean of the first channel is adapted to the average value calculated by averaging over a face image data-set.

$$E[\text{face area}] = \frac{1}{N_{data-set}} \sum_{J \in data-set} \frac{1}{\text{area of face}} \sum_{i,j \in input\ image} J_{i,j}(\text{face area}),$$

$$\text{Var}[\text{face area}] = \frac{1}{N_{data-set} - 1}$$
$$\sum_{J \in data-set} \frac{1}{\text{area of face}} \sum_{i,j \in input\ image} (J_{i,j}(\text{face area}) - E[\text{face area}])^2,$$

where $E[.]$ is the mean and $\text{Var}[.]$ is the variance of the pixel intensity. Then the light intensity of the input face image is normalized:

$$I_{i,j} = \frac{I_{i,j} - E[\text{face area}]}{\text{Var}[\text{face area}]}.$$

Adjusting the light intensity of the sub-areas corresponding to detected faces produces a first lightened, aligned and whiten face.

Continuing with FIG. 19, and according to this illustrated embodiment, a second iteration of the first face detection on the user robot side is applied at step 432. The second iteration can apply the same face detection algorithm as the first iteration applied at step 424 but is applied to a higher resolution image than the downsized image generated at step 416. Moreover, the second iteration is applied to an expanded sub-area of each sub-area detected in from the first iteration of step 424. In other words, and as described above, for each image sub-area identified from the first iteration step 424 as corresponding to a detected face (and which exceeds the confidence of detection threshold) that sub-area is expanded to include a neighborhood surrounding that sub-area. The size of the expanded sub-area is larger than the sub-area initially outputted from the first iteration of step 424, but is smaller than the full size of the originally captured image. A higher resolution version of this sub-area may then be enhanced by applying the image enhancement step 428. The second iteration 432 is then applied to the higher resolution expanded sub-area, which may further be image enhanced at step 428. The second iteration 432 of the first face detection outputs further image sub-areas corresponding to detected faces, but with more accurately detected sub-areas than the first iteration of step 424.

As the second iteration 432 face detection step (and the image enhancement step 428) is applied only to image sub-areas of the high-resolution images that contain face images with acceptable confidence scores (as determined from first iteration 424), it will be appreciated that a large portion of the high-resolution image will not be processed in the second iteration 432 of face detection, which saves a significant amount of computation on the user engagement device/robot 8.

At step 436, the image sub-areas corresponding to detected faces from the second iteration 432 of the first face detection at step 436 is further enhanced, for example, by applying the similar or same image enhancement as described with respect to step 428.

It was observed that applying the MTCNN face detection algorithm is computationally heavier than other face detection approaches, such as LBP-cascade. It was further observed that properties of the MTCNN approach struck an appropriate balance between carrying out a greater amount of processing on the side of the user engagement device/robot 8 and managing the number of captured images that are transmitted to the server 96 for further processing. For example, MTCNN face detection returns a confidence of detection metric. As described above, having this metric allows filtering images that have a detected face having a low confidence values such that these images are not transmitted to the server 96 for further processing. It will be appreciated that this has the effect of decreasing the bandwidth requirements related to transmitting captured images to the server 96.

The sub-areas identified by the user robot engagement robot face detection is transmitted to the server 96 for further processing. In one example embodiment, and as illustrated, each sub-area identified by the robot-side face detection (ex: from step 432) are resized in a step 440 prior to transmission to the server 96. The resizing can be applied so that each transmitted sub-area has uniform characteristics, such as uniform size and resolution. In one example embodiment, each sub-area corresponding to a detected face is resized to 300×300 pixels.

The second down-sized sub-areas are transmitted to the server 96 for application of the server-side second face detection step 224. According to one example, each transmitted sub-area is normalized by applying the image enhancement described herein with reference to step 436. It was observed that adjusting the light intensity of the images, for example to apply a synthetic image whitening can increase the true-positive-rate of the second face detection 224 applied on the side of the server 96.

The example embodiment illustrated in FIG. 19 carries out two iterations of face detection on the device/robot-side at steps 424 and 432. This configuration can be applied where the computational load available at the user engagement device/robot 8 is sufficient to carry out these two iterations in a timely manner. This has the advantage reducing bandwidth requirements related to transmitting first processed images because there are less transmissions of false positives.

In one example embodiment, the first and second iterations at steps 424 and 432 represent the totality of face detection steps of the image processing carried out both at the user engagement device/robot 8 and at the server 96. In such embodiments, where the second iteration of face detection at step 432 is carried out, the second face detection 224 at server 96 is omitted.

In other embodiments, the second iteration of step 432 (and the image enhancement 436) can be carried out as part of the second face detection step 224 at the server 96.

In yet other embodiments, the first and second iterations at steps 424 and 432 are carried out as part of the first face detection of the user engagement device/robot 8 and the second face detection step 224 is further applied at the server 96.

Distribution of Computational Load and Bandwidth Management

As described elsewhere herein the computing power of the remotely connected server 96 is significantly greater than the computing power of each individual user engagement device/robot 8. Furthermore, the server 96 can be scaled upwardly or downwardly to increase or decrease its computing power according to the needs of the required solution.

In one experimental setup of the user engagement device/robot 8 applying the Further Face Detection/Facial Recognition Method described herein above, it was observed that the application of a first set of image processing steps related to facial recognition (ex: motion detection step 218, face detection 216, tracking 426) to one human user constantly positioned in front of the image capture device at 1 frame per second generated the following computational load and bandwidth requirements (using a system having i5-8259U, 2.3 GHZ, 4 CORES (8 THREADS, i.e., 8 LOGICAL CORES), 16 GB RAM, OS Ubuntu 18.04):

CPU USAGE: 15.41%
AVERAGE BYTES PER SECOND (1 FPS per each person): 12.21 KB/s
FLOPS: 1.38 GFLOPS
BYTES REQUIRED PER FACE RECOGNITION INSTANCE: 10 KB For the same application to two human users constantly positioned in front of the image capture device at 1 frame per second (1 FPS per user for 2 FPS total) generated the following computational load and bandwidth requirements:

CPU Usage: 19.7%
AVERAGE BYTES PER SECOND (1 FPS per each person): 27.67 KB/s
FLOPS: 1.812 GFLOPS
BYTES REQUIRED PER FACE RECOGNITION INSTANCE: 10 KB It will be appreciated that the computational load for carrying out the first set of image processing steps at the user engagement device/robot 8 is in the gigaflop range. This is orders of magnitude lower than available computational power on the server 96 (ex: a cluster-based cloud server), which can have power in the teraflop or petaflop range.

It will also be appreciated that bandwidth requirement for transmitted the first processed images (ex: the downsized 300 px×300 px for each detected case) is in the kilobytes/second range. This is also orders of magnitude lower than the maximum bandwidth of commercially available communication devices (ex: Ethernet, 4G, LTE, or the like) which may be in the megabits/second range or higher.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A system for performing distributed facial analysis comprising:
   a computerized device having an image capture device, a communication device, and a first processor configured for:
   controlling the image capture device to capture an image of a scene;
   applying a first set of one or more image processing steps to the captured image to selectively output at least a first processed image, the first set of image processing steps comprising applying a first face detection to detect at least one face in the captured image and the first processed image having the detected at least one face; and
   transmitting the first processed image by the communication device; and
   a server located remotely of the computerized device, the server having at least one second processor operatively connected to a database storing a plurality of user entries each being associated with a user facial image and at least one user property, the second processor configured for:
   receiving the first processed image transmitted from the computerized device;
   applying a second set of image processing steps to determine a given one of the stored user facial images matching the face of the first processed image; and
   transmitting the at least one user property associated to the given matching user facial image to the computerized device; and
   wherein applying the first set of image processing steps comprises:
   applying the first face detection to the captured image to determine at least one subarea of the captured image containing the at least one face; and
   outputting the at least one subarea as the at least one first processed image; and
   wherein applying the second set of image processing steps comprises:
   applying a second face detection to the received first processed image; and
   if the second face detection determines that a face is not present within the first processed image, discarding the image for further processing within the second set of image processing steps;
   wherein the second face detection has a lower probability of detecting a false positive than the first face detection.

2. The system of claim 1, wherein if a plurality of subareas are identified, each corresponding to one detected face, the second set of image processing steps is initially applied to the largest subarea.

3. The system of claim 1, wherein applying the first face detection comprises:
   operating in an active face detection mode wherein the first face detection is applied directly to the captured image; and operating in a motion detection mode wherein motion detection is applied to the captured image, and if motion is detected in the captured image, applying the first face detection to the captured image;

wherein the image capture device is controlled to capture a sequence of images, the first face detection being applied to each of the sequence of images;

wherein the first face detection enters the motion detection mode from the active face detection mode upon no faces being detected within the sequence of images over a predefined time interval; and wherein the first face detection enters the active face detection mode from the motion detection mode upon detecting a motion from applying the first face detection while operating in the motion detection mode.

4. The system of claim 1, wherein applying the second set of image processing steps further comprises:

evaluating the quality of the second processed image for facial analysis, the evaluating generating a set of at least one quality metric; and if the at least one quality metric is below a set of at least one metric threshold, discarding the image for further processing within the second set of image processing steps.

5. The system of 1, wherein applying the second set of image processing steps further comprises:

applying facial feature extraction to the processed image to extract facial features from the processed face image; and applying face recognition to determine the given one of the stored user facial images matching the face of the first processed image.

6. The system of claim 5, wherein if the face recognition fails to determine a match of the face of the first processed image with one of the stored user facial image:

creating a new user entry within the database of the plurality of user entries and storing the processed image in association with the user entry;

training the face classifier with the processed image;

displaying a prompt by the computerized device for user information entry;

receiving, at the computerized device, via a user interactive device, one or more user properties;

transmitting the received user properties by the communication device to the server; and receiving the user properties at the server and storing the user properties in association with the newly created user entry.

7. The system of claim 1, wherein the system comprises a plurality of computerized devices, each having an image capture device, a communication device and a processor, and each being configured to capture an image and to transmit the captured image to the server for application of the second set of image processing steps.

8. The system of claim 1, wherein the server is further configured for:

determining a device interactive action based on the user property;

transmitting the determined action to the computerized device; and wherein the computerized device is further configured for:

receiving the interactive action from the server; and performing the determined interaction at the computerized device.

9. A method for performing distributed facial analysis comprising:

capturing, at a computerized device, an image of a scene;

applying, at the computerized device, a first set of one or more image processing steps to the captured image to selectively output at least a first processed image, the first set of image processing steps comprising applying a first face detection to detect at least one face in the captured image and the first processed image having the detected at least one face;

transmitting, from the computerized device, the first processed image;

receiving the first processed image transmitted from the computerized device at a remotely located server having a database storing a plurality of user entries each being associated with a user facial image and at least one user property;

applying, at the server, a second set of image processing steps to determine a given one of the stored user facial images matching the face of the first processed image; and transmitting, from the server, the at least one user property associated to the given matching user facial image to the computerized device;

wherein applying the first set of image processing steps comprises:

applying the first face detection to the captured image to determine at least one subarea of the captured image containing the at least one face; and outputting the at least one subarea as the at least one first processed image; and wherein applying the second set of image processing steps comprises:

applying a second face detection to the received first processed image; and if the second face detection determines that a face is not present within the first processed image, discarding the image for further processing within the second set of image processing steps;

wherein the second face detection has a lower probability of detecting a false positive than the first face detection.

10. The method of claim 9, wherein applying the first face detection comprises:

operating in an active face detection mode wherein the first face detection is applied directly to the captured image; and operating in a motion detection mode wherein motion detection is applied to the captured image, and if motion is detected in the captured image, applying the first face detection to the captured image;

wherein a sequence of images are captured, the first face detection being applied to each of the sequence of images;

wherein the first face detection enters the motion detection mode from the active face detection mode upon no faces being detected within the sequence of images over a predefined time interval; and wherein the first face detection enters the active face detection mode from the motion detection mode upon detecting a motion from applying the first face detection while operating in the motion detection mode.

11. The method of claim 9, wherein applying the second set of image processing steps further comprises:

evaluating the quality of the second processed image for facial analysis, the evaluating generating a set of at least one quality metric; and if the at least one quality metric is below a set of at least one metric threshold, discarding the image for further processing within the second set of image processing steps.

12. The method of claim 9, wherein applying the second set of image processing steps further comprises:
    applying facial feature extraction to the processed image to extract facial elements from the face of the processed image; and
    applying face recognition to determine the given one of the stored user facial images matching the face of the first processed image.

13. The method of claim 12, wherein if the face recognition fails to determine a match of the face of the first processed image with one of the stored user facial image:
    creating a new user entry within the database of the plurality of user entries and storing the processed image in association with the user entry;
    training the face classifier with the processed image;
    displaying a prompt by the computerized device for user information entry;
    receiving, at the computerized device, via a user interactive device, one or more user properties;
    transmitting the received user properties by the communication device to the server; and
    receiving the user properties at the server and storing the user properties in association with the newly created user entry.

14. The method of claim 9, further comprising:
    determining, at the server, an interactive action based on the user property;
    transmitting the determined action to the computerized device; and
    receiving the interactive action from the server at the computerized device; and
    performing the determined interaction at the computerized device.

15. A system for performing distributed facial analysis comprising:
    a computerized device having an image capture device, a communication device, and a first processor configured for:
        controlling the image capture device to capture an image of a scene;
        applying a first set of one or more image processing steps to the captured image to selectively output at least a first processed image, the first set of image processing steps comprising applying a first face detection to detect at least one face in the captured image and the first processed image having the detected at least one face; and
        transmitting the first processed image by the communication device; and
    a server located remotely of the computerized device, the server having at least one second processor operatively connected to a database storing a plurality of user entries each being associated with a user facial image and at least one user property, the second processor configured for:
        receiving the first processed image transmitted from the computerized device;
        applying a second set of image processing steps to determine a given one of the stored user facial images matching the face of the first processed image; and
        transmitting the at least one user property associated to the given matching user facial image to the computerized device; and
    wherein applying the first set of image processing steps comprises:
        applying the first face detection to the captured image to determine at least one subarea of the captured image containing the at least one face; and
        outputting the at least one subarea as the at least one first processed image; and
    wherein applying the second set of image processing steps further comprises:
        evaluating the quality of the second processed image for facial analysis, the evaluating generating a set of at least one quality metric; and
        if the at least one quality metric is below a set of at least one metric threshold, discarding the image for further processing within the second set of image processing steps.

* * * * *